US012623478B2

(12) United States Patent
Koide et al.

(10) Patent No.: US 12,623,478 B2
(45) Date of Patent: May 12, 2026

(54) THERMOSENSITIVE RECORDING LAYER FORMING LIQUID, THERMOSENSITIVE RECORDING MEDIUM AND PRODUCTION METHOD THEREOF, AND IMAGE RECORDING METHOD

(71) Applicants: Shohta Koide, Shizuoka (JP); Kazumasa Noda, Shizuoka (JP); Takahiro Shibata, Shizuoka (JP)

(72) Inventors: Shohta Koide, Shizuoka (JP); Kazumasa Noda, Shizuoka (JP); Takahiro Shibata, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 77 days.

(21) Appl. No.: 18/550,888

(22) PCT Filed: Mar. 1, 2022

(86) PCT No.: PCT/JP2022/008689

§ 371 (c)(1),
(2) Date: Sep. 15, 2023

(87) PCT Pub. No.: WO2022/202154

PCT Pub. Date: Sep. 29, 2022

(65) Prior Publication Data

US 2024/0181797 A1 Jun. 6, 2024

(30) Foreign Application Priority Data

Mar. 22, 2021 (JP) ................................ 2021-047167

(51) Int. Cl.
*B41M 5/333* (2006.01)
*B41M 5/337* (2006.01)
(Continued)

(52) U.S. Cl.
CPC ........ *B41M 5/3333* (2013.01); *B41M 5/3372* (2013.01); *B41M 5/42* (2013.01);
(Continued)

(58) Field of Classification Search
CPC .. B41M 5/323; B41M 5/3333; B41M 5/3372; B41M 5/42; B41M 5/465; B41M 2205/04; B41M 2205/38; B41M 2205/40
See application file for complete search history.

(56) References Cited

U.S. PATENT DOCUMENTS

| | | | |
|---|---|---|---|
| 6,624,117 | B1 | 9/2003 | Heneghan et al. |
| 2004/0029056 | A1 | 2/2004 | Tsukada |

(Continued)

FOREIGN PATENT DOCUMENTS

| | | | |
|---|---|---|---|
| CN | 111100514 | | 5/2020 |
| EP | 3677569 | A1 | 7/2020 |

(Continued)

OTHER PUBLICATIONS

International Search Report Issued Jun. 24, 2022 for counterpart International Patent Application No. PCT/JP2022/008689 filed Mar. 1, 2022.

(Continued)

*Primary Examiner* — Gerard Higgins
(74) *Attorney, Agent, or Firm* — Grüneberg Global IP, PLLC

(57) ABSTRACT

Provided is a thermosensitive recording medium including a support and a thermosensitive recording layer disposed on or above the support. The thermosensitive recording layer include a compound represented by General Formula (1) and a styrene-acryl resin, where, in General Formula (1), $R_2$ is a C1-12 straight-chain, branched-chain, or alicyclic alkyl group, C7-12 aralkyl group that is substituted with a C1-12
(Continued)

alkyl group, a C1-12 alkoxy group, a C6-12 aryl group or a halogen atom, or a C6-12 aryl group that is unsubstituted or substituted with a C1-12 alkyl group, a C1-12 alkoxy group, a C6-12 aryl group, or a halogen atom, where two or more $R_2$ may be identical to or different from each other; and $A_1$ is a hydrogen atom or a C1-4 alkyl group, where two or more $A_1$, may be identical to or different from each other.

(1)

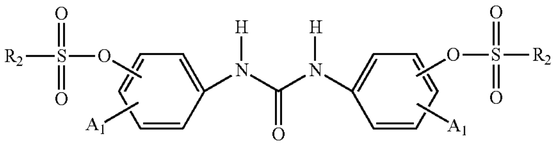

19 Claims, 3 Drawing Sheets

(51) Int. Cl.

| | |
|---|---|
| ***B41M 5/42*** | (2006.01) |
| *B41M 5/323* | (2006.01) |
| *B41M 5/46* | (2006.01) |

(52) U.S. Cl.

CPC ............ *B41M 5/323* (2013.01); *B41M 5/465* (2013.01); *B41M 2205/04* (2013.01); *B41M 2205/38* (2013.01); *B41M 2205/40* (2013.01)

(56) References Cited

U.S. PATENT DOCUMENTS

| | | | |
|---|---|---|---|
| 2006/0178254 A1 | 8/2006 | Takeda et al. | |
| 2015/0284321 A1 | 10/2015 | Sakai et al. | |
| 2018/0201040 A1* | 7/2018 | Terada | B41M 5/366 |
| 2019/0152248 A1 | 5/2019 | Noda et al. | |
| 2020/0316976 A1 | 10/2020 | Sawamura et al. | |
| 2021/0340099 A1 | 11/2021 | Kinishi et al. | |

FOREIGN PATENT DOCUMENTS

| | | | |
|---|---|---|---|
| JP | 1-209188 A | | 8/1989 |
| JP | 7-266709 A | | 10/1995 |
| JP | 11-115317 A | | 4/1999 |
| JP | 2000-052661 A | | 2/2000 |
| JP | 2002137534 A | * | 5/2002 |
| JP | 2003-103929 A | | 4/2003 |
| JP | 2003-285557 | | 10/2003 |
| JP | 2004-291519 | | 10/2004 |
| JP | 2005-187323 | | 7/2005 |
| JP | 2007-307781 A | | 11/2007 |
| JP | 4601174 | | 12/2010 |
| JP | 2011-056804 A | | 3/2011 |
| JP | 5887423 | | 3/2016 |
| JP | 2017-124537 A | | 7/2017 |
| JP | 2020-082406 | | 6/2020 |
| JP | 6751479 | | 9/2020 |
| JP | 7679658 B2 | | 5/2025 |
| WO | WO2005/037932 | | 4/2005 |
| WO | 2009/028118 A1 | | 3/2009 |
| WO | WO2019/044462 | | 3/2020 |
| WO | WO2020/105564 | | 5/2020 |

OTHER PUBLICATIONS

Converting Technical Institute Edition, "Comprehensive Guide to Functional Materials—Encyclopedia of Functional Materials Useful for Manufacturing", Converting Technical Institute, the cover, the front p. Mar. 2011, pp. 54, 6 pages with English translation. (Publication 11).

Converting Technical Institute Edition, "Comprehensive Guide to Functional Materials—Encyclopedia of Functional Materials Useful for Manufacturing", Converting Technical Institute, the cover, the front p. Mar. 2011, p. 54., 6 pages with English translation. (Publication 12).

Gantz Kasei Co. Ltd., Product Catalog, Jul. 2006, 24 pages with English translation. (Publication 13).

Henkel Japan Ltd., "Product Catalog", May 24, 2011, 26 pages with English translation. (Publication 14).

Notice of reasons for Refusal for Japanese Patent Application 2025-077528 dated Mar. 17, 2026, 5 pages with English translation.

Notice of Submission of Publication for Japanese Application No. 2025-077528, dated Feb. 17, 2026, 141 pages with English Translation.

Saiden Chemical Industry Co. Ltd., "Product Document", Moisture resistant coating agent, Coating agent for general paper, May 17, 2002, 56 pages with English translation. (Publication 16).

Seiko PMC Corporation, Product Catalog, Jan. 2020, 32 pages with English translation. (Publication 15).

* cited by examiner

[Fig. 1]
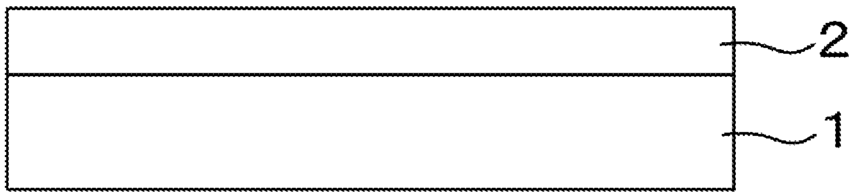
[Fig. 2]
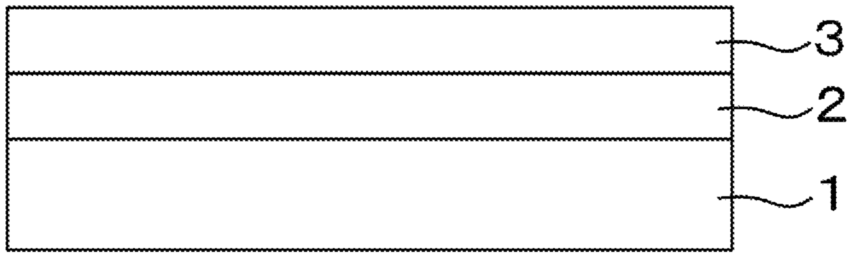
[Fig. 3]
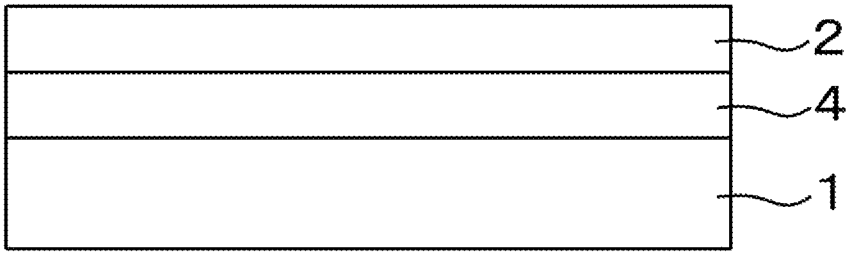
[Fig. 4]
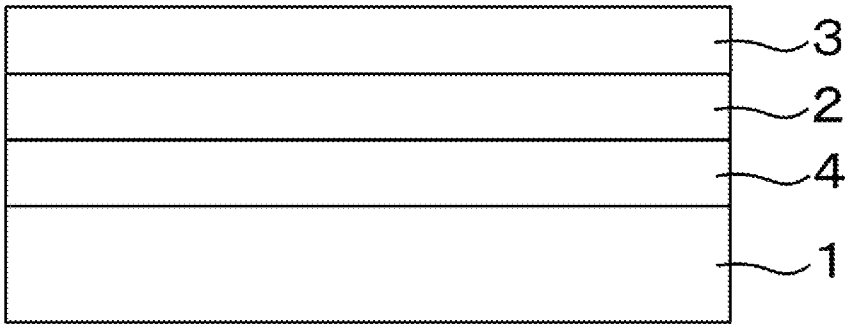
[Fig. 5]
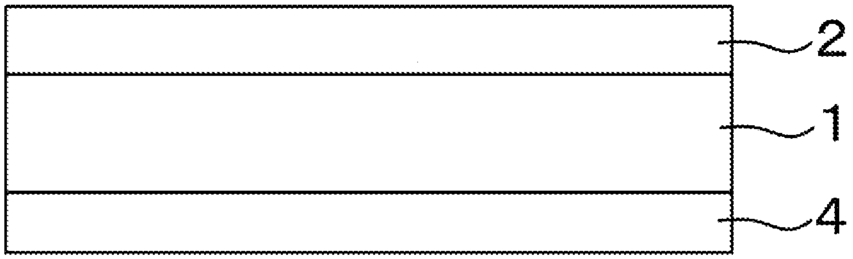

[Fig. 6]
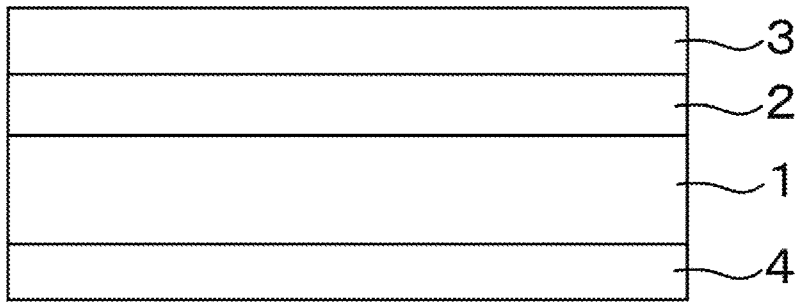
[Fig. 7]
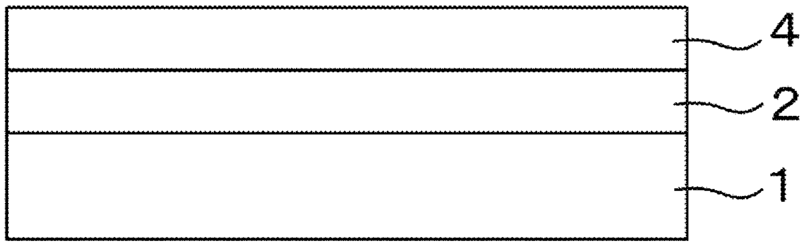
[Fig. 8]
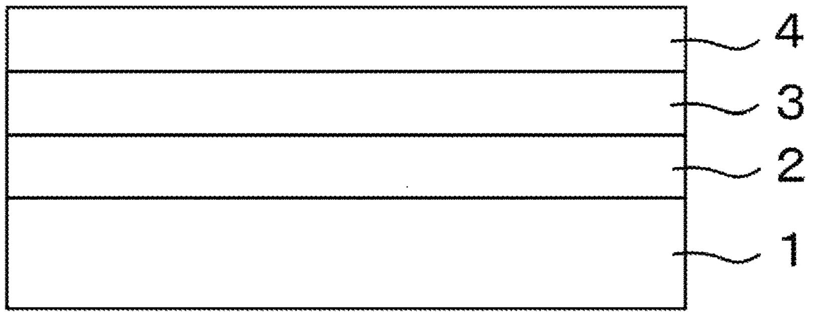
[Fig. 9]
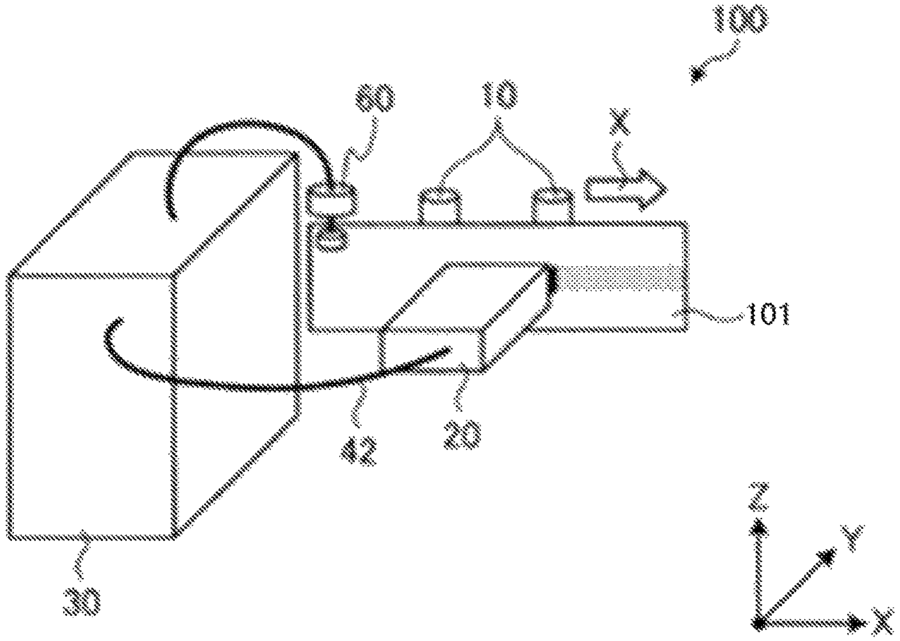

[Fig. 10]
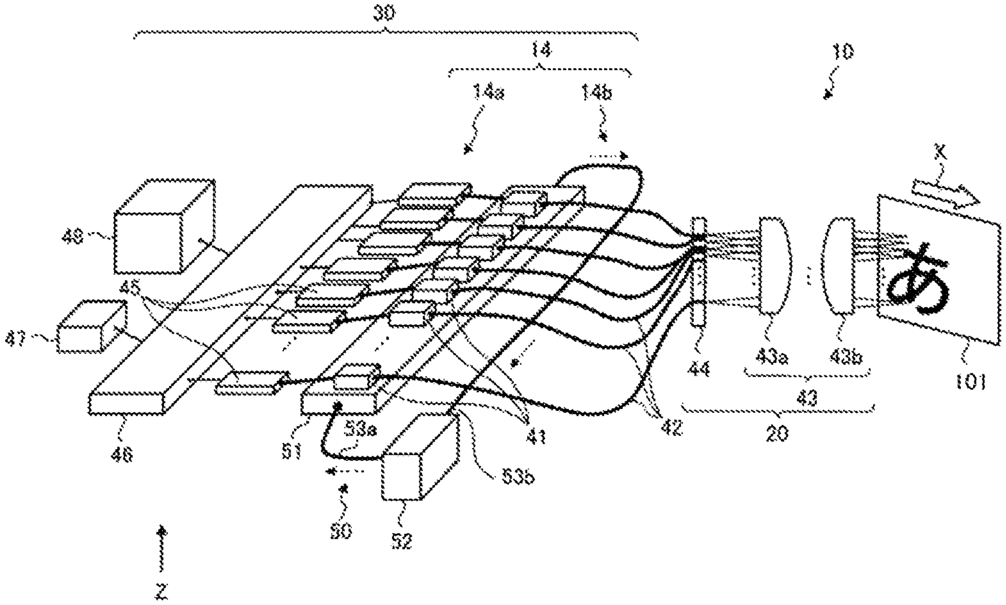
[Fig. 11]
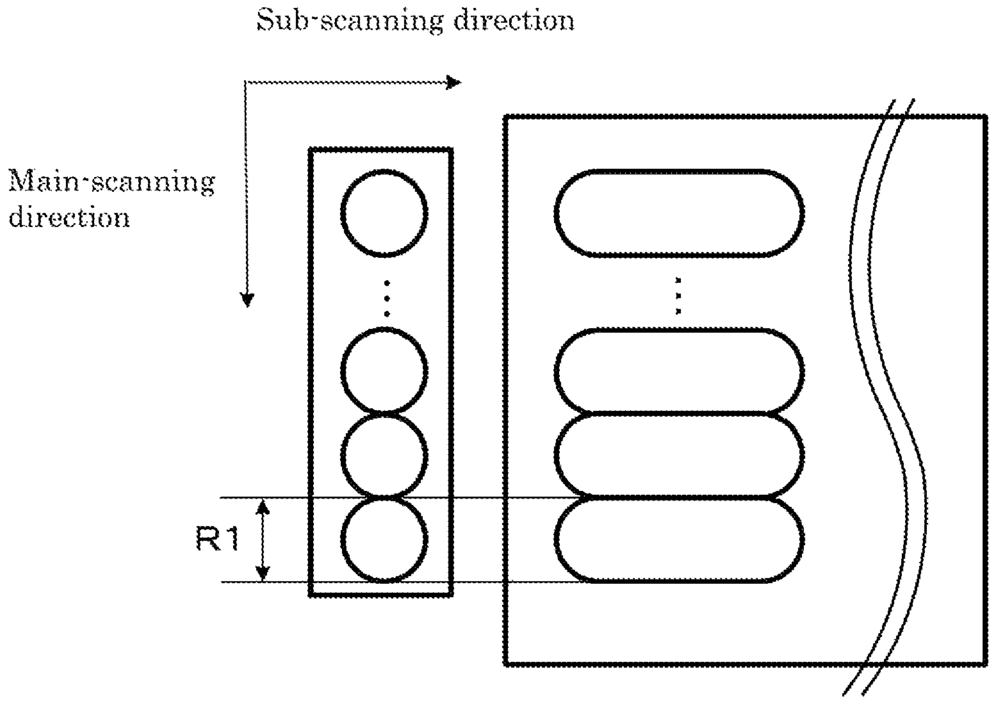

THERMOSENSITIVE RECORDING LAYER FORMING LIQUID, THERMOSENSITIVE RECORDING MEDIUM AND PRODUCTION METHOD THEREOF, AND IMAGE RECORDING METHOD

CROSS-REFERENCE TO RELATED APPLICATIONS

This application is the National Stage entry under § 371 of International Application No. PCT/JP2022/008689, filed on Mar. 1, 2022, and which claims the benefit of priority to Japanese Patent Application No. 2021-047167, filed on Mar. 22, 2021. The content of each of these applications is hereby incorporated by reference in its entirety.

TECHNICAL FIELD

The present disclosure relates to a thermosensitive recording layer forming liquid, a thermosensitive recording medium and production method thereof, and an image recording method.

BACKGROUND ART

Compared to other recording methods, a thermosensitive recording method using a thermosensitive recording medium has advantages that recording can be performed within a short period of time using a relatively simple device without performing processes, such as developing and fixing, and cost thereof is low. Therefore, use of the thermosensitive recording method has been rapidly spread in the field of food products, such as packed meals, and ready-made meals, where reliability of images is important.

In the field of food products, thermosensitive recording media has been used as a label for a PET bottle or a label for fresh food. Therefore, it is expected that a thermosensitive recording medium is exposed in water or hot water during use. When an image area of a thermosensitive recording medium comes in contact with water or hot water, the image area in contact with water or hot water may be discolored or faded. Particularly, discoloring or fading may be expected at a temperature of hot drink sold by bending machines (for example, the temperature is kept at 60° C. for a several hours), a temperature of hot water comes out from a tap (for example, the temperature is kept at 60° C. for a several minutes), or a temperature of a hot wash mode of a washing machine (for example, a temperature is kept at from 40° C. through 60° C. for several hours).

Moreover, packaging films for various containers, such as PET bottles for soft drinks, metal cans for cans of coffee etc., bottles of energy drinks or medical products, and bottles for beer, and packaging labels for use in the field of the POS system for fresh food, packed meals, premade meals, etc. are desired to have all of ethanol resistance, temperature and humidity resistance, wet abrasion resistance, and heat resistance, as well as the above-mentioned hot water resistance and water resistance.

In order to improve water resistance of an image arca, therefore, proposed are, for example, adding polyvinyl alcohol and a polyamide epichlorohydrin resin to a thermosensitive recording layer, using hydrophobic resin emulsion, such as vinyl acetate emulsion, acrylic emulsion, and SBR latex, as a binder of a thermosensitive recording layer, or using a non-phenolic color developer that does not include a phenol-based compound as a color developer of a thermosensitive recording layer (see, for example, PTL 1).

CITATION LIST

Patent Literature

PTL 1: Japanese Patent No. 6,751,479

SUMMARY OF INVENTION

Technical Problem

The present disclosure has an object to provide a thermosensitive recording medium that can form an image of high concentration, as well as having hot water resistance, water resistance, ethanol resistance, temperature-humidity resistance, wet abrasion resistance, and heat resistance.

Solution to Problem

According to one aspect of the present disclosure, a thermosensitive recording medium includes a support, and a thermosensitive recording layer disposed on or above the support. The thermosensitive recording layer includes a compound represented by General Formula (1) and a styrene-acryl resin.

[Chem.1]

General Formula (1)

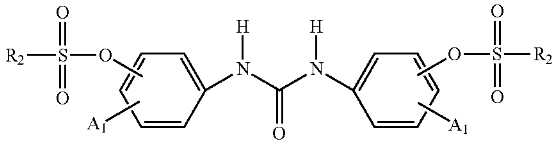

In General Formula (1), $R_2$ is a C1-12 straight-chain, branched-chain, or alicyclic alkyl group, a C1-12 alkoxy group that is unsubstituted or substituted with a C1-12 alkyl group, a C7-12 aralkyl group that is substituted with a C6-12 aryl group or a halogen atom, or a C6-12 aryl group that is unsubstituted or substituted with a C1-12 alkyl group, a C1-12 alkoxy group, a C6-12 aryl group, or a halogen atom, where two or more $R_2$ may be identical to or different from each other; and $A_1$ is a hydrogen atom or a C1-4 alkyl group, where two or more $A_1$, may be identical to or different from each other.

Advantageous Effects of Invention

The present disclosure can provide a thermosensitive recording medium that can form an image of high concentration, as well as having hot water resistance, water resistance, ethanol resistance, temperature-humidity resistance, wet abrasion resistance, and heat resistance.

BRIEF DESCRIPTION OF DRAWINGS

FIG. 1 is a schematic cross-sectional view illustrating an example of the thermosensitive recording medium according to the first embodiment.

FIG. 2 is a schematic cross-sectional view illustrating an example of the thermosensitive recording medium according to the second embodiment.

FIG. 3 is a schematic cross-sectional view illustrating an example of the thermosensitive recording medium according to the third embodiment.

FIG. 4 is a schematic cross-sectional view illustrating an example of the thermosensitive recording medium according to the fourth embodiment.

FIG. 5 is a schematic cross-sectional view illustrating an example of the thermosensitive recording medium according to the fifth embodiment.

FIG. 6 is a schematic cross-sectional view illustrating an example of the thermosensitive recording medium according to the sixth embodiment.

FIG. 7 is a schematic cross-sectional view illustrating an example of the thermosensitive recording medium according to the seventh embodiment.

FIG. 8 is a schematic cross-sectional view illustrating an example of the thermosensitive recording medium according to the eighth embodiment.

FIG. 9 is a schematic view illustrating an example of an image recording device used for the image recording method of the present disclosure.

FIG. 10 is a schematic view illustrating another example of the image recording device used for the image recording method of the present disclosure.

FIG. 11 is view illustrating an alignment state of laser arrays of an image recording device used for the image recording method of the present disclosure.

DESCRIPTION OF EMBODIMENTS (Thermosensitive Recording Medium)

The thermosensitive recording medium of the present disclosure is a thermosensitive recording medium including a support, and a thermosensitive recording layer disposed on or above the support. The thermosensitive recording layer includes a compound represented by General Formula (1) and a styrene-acryl resin. The thermosensitive recording medium may further include other layers according to the necessity.

[Chem.2]

General Formula (1)

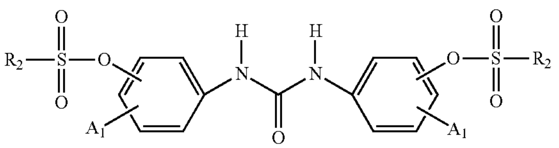

In General Formula (1), $R_2$ is a C1-12 straight-chain, branched-chain, or alicyclic alkyl group, a C1-12 alkoxy group that is unsubstituted or substituted with a C1-12 alkyl group, a C7-12 aralkyl group that is substituted with a C6-12 aryl group or a halogen atom, or a C6-12 aryl group that is unsubstituted or substituted with a C1-12 alkyl group, a C1-12 alkoxy group, a C6-12 aryl group, or a halogen atom, where two or more $R_2$ may be identical to or different from each other; and $A_1$ is a hydrogen atom or a C1-4 alkyl group, where two or more $A_1$, may be identical to or different from each other.

In the related art, water resistance of a thermosensitive recording medium can be secured against water of normal temperature (25° C.) by using a certain non-phenolic color developer, but there is a problem that an image area thereof is discolored or faded when the thermosensitive recording medium is exposed to hot water (60° C. or higher).

In the present disclosure, a thermosensitive recording medium includes a support, and a thermosensitive recording layer on or above the support, and the thermosensitive recording layer includes a compound represented by General Formula (1) and a styrene-acryl resin. Therefore, the thermosensitive recording medium of the present disclosure can form an image of a high density, as well as achieving all of hot water resistance, water resistance, ethanol resistance, temperature and humidity resistance, wet abrasion resistance, and heat resistance.

<Thermosensitive Recording Layer>

The thermosensitive recording layer includes a compound represented by General Formula (1) and a styrene-acryl resin, and preferably further includes a leuco dye and a photothermal conversion material. The thermosensitive recording layer may further include other components.

<<Compound Represented by General Formula (1)>>

The compound represented by General Formula (1) is a non-phenolic color developer. The term "non-phenolic" means that a compound does not have a phenol skeleton. Since the thermosensitive recording layer includes the non-phenolic color developer, the thermosensitive recording layer does not need to include a phenolic color developer that may be determined as an endocrine disruptor, and therefore a resulting thermosensitive recording medium is excellent considering influence to the environment.

In General Formulae (1) and (2), $R_2$ is a C1-12 straight-chain, branched-chain, or alicyclic alkyl group, or a C7-12 aralkyl group or C6-12 aryl group that is unsubstituted or substituted with a C1-12 alkyl group, a C1-12 alkoxy group, a C6-12 aryl group, or a halogen atom, where two or more $R_2$ may be identical to or different from each other; and $A_1$ is a hydrogen atom or a C1-4 alkyl group, where two or more $A_1$ may be identical to or different from each other.

In General Formula (3), R is an alkyl group, and n is an integer of from 0 through 3. The number of carbon atoms of the alkyl group of R may be from 1 through 12, from 1 through 8, or from 1 through 4.

In General Formula (1), the substitution positions of a plurality of $R_2—SO_3—$ may be identical to or different from each other. The substitution position thereof is preferably the 3-position, the 4-position, or the 5-position, and more preferably the 3-position.

Examples of the C1-12 straight-chain, branched-chain, or alicyclic alkyl group of $R_2$ include C1-12 straight-chain, branched-chain, or alicyclic alkyl groups, such as a methyl group, an ethyl group, a n-propyl group, an i-propyl group, a n-butyl group, an i-butyl group, a t-butyl group, a cyclopentyl group, a hexyl group, a cyclohexyl group, a 2-ethylhexyl group, and a lauryl group.

Examples of the aralkyl group include an aralkyl group that is unsubstituted or substituted with an alkyl group, an alkoxy group, an aralkyl group, an aryl group, or a halogen atom, such as a benzyl group, a 1-phenylethyl group, a 2-phenylethyl group, a 3-phenylpropyl group, a p-methylbenzyl group, a m-methylbenzyl group, a methylbenzyl group, a p-ethylbenzyl group, a p-i-propylbenzyl group, a p-t-butylbenzyl group, a p-methoxybenzyl group, a m-methoxybenzyl group, a o-methoxybenzyl group, a m,p-di-methoxybenzyl group, a p-ethoxy-m-methoxybenzyl group, a p-phenylmethylbenzyl group, a p-cumylbenzyl group, a p-phenylbenzyl group, a o-phenylbenzyl group, a m-phenylbenzyl group, a p-tolylbenzyl group, a m-tolylbenzyl group, a o-tolylbenzyl group, or a p-chlorobenzyl group.

Examples of the aryl group include an aryl group that is unsubstituted or substituted with an alkyl group, an alkoxy group, an aralkyl group, an aryl group, or a halogen atom, such as a phenyl group, a p-tolyl group, a m-tolyl group, an o-tolyl group, a 2,5-dimethylphenyl group, a 2,4-dimethylphenyl group, a 3,5-dimethylphenyl group, a 2,3-dimethylphenyl group, a 3,4-dimethylphenyl group, a mesitylene group, a p-ethylphenyl group, a p-i-propylphenyl group, a p-t-butylphenyl group, a p-methoxyphenyl group, a 3,4-dimethoxyphenyl group, a p-cthoxyphenyl group, a p-chlorophenyl group, a 1-naphthyl group, a 2-naphthyl group, and a t-butylated naphthyl group.

The substitution positions of a plurality of $A_1$ may be the same substitution sites, or different substitution sites. The substitution position thereof is preferably the 3-position, the 4-position, or the 5-position.

$A_1$ is a hydrogen atom, or an alkyl group, such as a methyl group, an ethyl group, a propyl group, an isopropyl group, a butyl group, an isobutyl group, a sec-butyl group, and a t-butyl group.

Specific examples of the compound represented by General Formulae (1) to (3) include, but are not limited to, the following compounds. Two or more compounds may be used in combination as the color developer.

Moreover, use of a combination of known color developers, such as a combination of a known nonphenolic color developer (e.g., N-3-[(p-toluenesulfonyl)oxy]phenyl-N'-(p-toluenesulfonyl)-urea, and N-[2-(3-phenylureide)phenyl]-benzenesulfonamide) and a known color developer (e.g., 4,4'-isopropylidenediphenol (BPA), 4,4'-dihydroxydiphenylsulfone (BPS), 4-allyloxy-4'-hydroxydiphenylsulfone, 4-allyloxy-4'-hydroxy-diphenylsulfone, 4-hydroxy-4'-isopropoxysulfone, N-(m-tolylaminocarbonyl)-methionine, N-(m-tolylaminocarbonyl)-phenylalanine, and N-(phenylaminocarbonyl)-phenylalanine), can further improve preservability that is a problem of the known color developers.

Examples of the compounds represented by General Formulae (1) to (3) include N,N'-di-[3-(benzenesulfonyloxy)phenyl]urea, N,N'-di-[3-(benzenesulfonyloxy)-4-methylphenyl]urea, N,N'-di-[3-(benzenesulfonyloxy)-4-ethylphenyl]urea, N,N'-di-[3-(benzenesulfonyloxy)-5-methylphenyl]urea, N,N'-di-[3-(benzenesulfonyloxy)-4-propylphenyl]urea, N,N'-di-[3-(o-toluenesulfonyloxy)phenyl]urea, N,N'-di-[3-(m-toluenesulfonyloxy)phenyl]urea, N,N'-di-[3-(p-toluenesulfonyloxy)phenyl]urea, N,N'-di-[3-(p-toluenesulfonyloxy)-4-methyl-phenyl]urea, N,N'-di-[3-(p-xylenesulfonyloxy)phenyl]urea, N,N'-di-[3-(m-xylenesulfonyloxy)phenyl]urea, N,N'-di-[3-(mesitylenesulfonyloxy)phenyl]urea, N,N'-di-[3-(1-naphthalenesulfonyloxy)phenyl]urea, N,N'-di-[3-(2-naphthalenesulfonyloxy)phenyl]urea, N,N'-di-[3-(p-ethylbenzenesulfonyloxy)phenyl]urea, N,N'-di-[3-(p-propylbenzenesulfonyloxy)phenyl]urea, N,N'-di-[3-(p-isopropylbenzenesulfonyloxy)phenyl]urea, N,N'-di-[3-(p-t-butylbenzenesulfonyloxy)phenyl]urea, N,N'-di-[3-(p-methoxybenzenesulfonyloxy)phenyl]urea, N,N'-di-[3-(m-methoxybenzenesulfonyloxy)phenyl]urea, N,N'-di-[3-(o-methoxybenzenesulfonyloxy)phenyl]urea, N,N'-di-[3-(m,p-dimethoxybenzenesulfonyloxy)phenyl]urea, N,N'-di-[3-(p-ethoxybenzenesulfonyloxy)phenyl]urea, N,N'-di-[3-(p-propoxybenzenesulfonyloxy)phenyl]urea, N,N'-di-[3-(p-butoxybenzenesulfonyloxy)phenyl]urea, N,N'-di-[3-(p-cumylbenzylsulfonyloxy)phenyl]urea, N,N'-di-[3-(p-cumylbenzenesulfonyloxy)phenyl]urea, N,N'-di-[3-(o-phenylbenzenesulfonyloxy)phenyl]urea, N,N'-di-[3-(p-phenylbenzenesulfonyloxy)phenyl]urea, N,N'-di-[3-(p-chlorobenzenesulfonyloxy)phenyl]urea, N-[3-(benzenesulfonyloxy)phenyl]-N'-[3-(p-toluenesulfonyloxy)phenyl]urea, N-[3-(benzenesulfonyloxy)phenyl]-N'-[3-(m-toluenesulfonyloxy)phenyl]urea, N-[3-(benzenesulfonyloxy)phenyl]-N'-[3-(o-toluenesulfonyloxy)phenyl]urea, N-[3-(benzenesulfonyloxy)phenyl]-N'-[3-(p-xylenesulfonyloxy)phenyl]urea, N-[3-(benzenesulfonyloxy)phenyl]-N'-[3-(mesitylenesulfonyloxy)phenyl]urea, N-[3-(benzenesulfonyloxy)phenyl]-N'-[3-(1-naphthalenesulfonyloxy)phenyl]urea, N-[3-(benzenesulfonyloxy)phenyl]-N'-[3-(2-naphthalenesulfonyloxy)phenyl]urea, N-[3-(benzenesulfonyloxy)phenyl]-N'-[3-(p-ethylbenzenesulfonyloxy)phenyl]urea, N-[3-(benzenesulfonyloxy)phenyl]-N'-[3-(p-methoxybenzenesulfonyloxy)phenyl]urea, N-[3-(benzenesulfonyloxy)phenyl]-N'-[3-(benzylsulfonyloxy)phenyl]urea, N-[3-(benzenesulfonyloxy)phenyl]-N'-[3-(ethanesulfonyloxy)phenyl]urea, N-[3-(benzenesulfonyloxy)phenyl]-N'-[3-(benzenesulfonyloxy)-4-methylphenyl]urea, N-[3-(p-toluenesulfonyloxy)phenyl]-N'-[3-(m-toluenesulfonyloxy)phenyl]urea, N-[3-(p-toluenesulfonyloxy)phenyl]-N'-[3-(o-toluenesulfonyloxy)phenyl]urea, N-[3-(p-toluenesulfonyloxy)phenyl]-N'-[3-(p-toluenesulfonyloxy)-4-methylphenyl]urea, N-[3-(p-toluenesulfonyloxy)phenyl]-N'-[3-(p-ethylbenzenesulfonyloxy)phenyl]urea, N-[3-(p-toluenesulfonyloxy)phenyl]-N'-[3-(p-methoxybenzenesulfonyloxy)phenyl]urea, a, N-[3-(p-toluenesulfonyloxy)phenyl]-N'-[3-(2-naphthalenesulfonyloxy)phenyl]urea, N-[3-(p-toluenesulfonyloxy)phenyl]-N'-[3-(benzylsulfonyloxy)phenyl]urea, N-[3-(p-toluenesulfonyloxy)phenyl]-N'-[3-(p-methylbenzylsulfonyloxy)phenyl]urea, N-[3-(p-toluenesulfonyloxy)phenyl]-N'-[3-(p-methoxybenzylsulfonyloxy)phenyl]urea, N-[3-(p-toluenesulfonyloxy)phenyl]-N'-[3-(methanesulfonyloxy)phenyl]urea, N-[3-(p-toluenesulfonyloxy)phenyl]-N'-[3-(propanesulfonyloxy)phenyl]urea, N-[3-(p-toluenesulfonyloxy)phenyl]-N'-[3-(butanesulfonyloxy)phenyl]urea, N,N'-di-[3-(benzylsulfonyloxy)phenyl]urea, N,N'-di-[3-(benzylsulfonyloxy)-4-methyl-phenyl]urea, N,N'-di-[3-(phenylethanesulfonyloxy)phenyl]urea, N,N'-di-[3-(phenylpropanesulfonyloxy)phenyl]urea, N,N'-di-[3-(p-methoxybenzylsulfonyloxy)phenyl]urea, N-[3-(benzylsulfonyloxy)phenyl]-N'-[3-(p-methoxybenzylsulfonyloxy)phenyl]urea, N-[3-(benzylsulfonyloxy)phenyl]-N'-[3-(cthanesulfonyloxy)phenyl]urea, N-[3-(benzylsulfonyloxy)phenyl]-N'-[3-(butanesulfonyloxy)phenyl]urea, N,N'-di-[3-(methanesulfonyloxy)phenyl]urea, N,N'-di-[3-(methanesulfonyloxy)-4-methyl-phenyl]urea, N,N'-di-[3-(methanesulfonyloxy)-4-ethyl-phenyl]urea, N,N'-di-[3-(methanesulfonyloxy)-5-methyl-phenyl]urea, N,N'-di-[3-(methanesulfonyloxy)-4,5-dimethyl-phenyl]urea, N,N'-di-[3-(ethanesulfonyloxy)phenyl]urea, N,N'-di-[3-(ethanesulfonyloxy)-4-methyl-phenyl]urea, N,N'-di-[3-(1-propanesulfonyloxy)phenyl]urea, N,N'-di-[3-(2-propanesulfonyloxy)phenyl]urea, N,N'-di-[3-(butanesulfonyloxy)phenyl]urea, N,N'-di-[3-(pentanesulfonyloxy)phenyl]urea, N,N'-di-[3-(hexanesulfonyloxy)phenyl]urea, N,N'-di-[3-(cyclohexanesulfonyloxy)phenyl]urea, N,N'-di-[3-(dodecanesulfonyloxy)phenyl]urea, N-[3-(methanesulfonyloxy)phenyl]-N'-[3-(ethanesulfonyloxy)phenyl]urea, N-[3-(ethanesulfonyloxy)phenyl]-N'-[3-(propanesulfonyloxy)phenyl]urea, N-[3-(methanesulfonyloxy)phenyl]-N'-[3-(butanesulfonyloxy)phenyl]urea, N-[3-(ethanesulfonyloxy)phenyl]-N'-[3-(cyclohexanesulfonyloxy)phenyl]urea, N,N'-di-[4-(benzenesulfonyloxy)phenyl]urea, N,N'-di-[4-(benzenesulfonyloxy)-3-methyl-phenyl]urea, N,N'-di-[4-(benzenesulfonyloxy)-3-ethyl-phenyl]urea, N,N'-di-[4-(benzenesulfonyloxy)-3-propyl-phenyl]urea, N,N'-di-[4-(benzenesulfonyloxy)-3-t-butyl-phenyl]urea, N,N'-di-[4-(o-toluenesulfonyloxy)phenyl]urea, N,N'-di-[4-(m-toluenesulfonyloxy)phenyl]urea, N,N'-di-[4-(p-toluenesulfonyloxy)phenyl]urea, N,N'-di-[4-(p-toluenesulfonyloxy)-3-methyl-phenyl]urea, N,N'-di-[4-(p-xylenesulfonyloxy)phenyl]urea, N,N'-di-[4-(m-xylenesulfonyloxy)phenyl]urea, N,N'-di-[4-(mesitylenesulfonyloxy)phenyl]urea, N,N'-di-[4-(1-naphthalenesulfonyloxy)phenyl]urea, N,N'-di-[4-(2-naphthalenesulfonyloxy)phenyl]urea, N,N'-di-[4-(p-ethylbenzenesulfonyloxy)phenyl]urea, N,N'-di-[4-(p-propylbenzenesulfonyloxy)phenyl]urea, N,N'-di-[4-(p-isopropylbenzenesulfonyloxy)phenyl]urea, N,N'-di-[4-(p-t-butylbenzenesulfonyloxy)phenyl]urea, N,N'-di-[4-(p-methoxybenzenesulfonyloxy)phenyl]urea, N,N'-di-[4-(m-methoxybenzenesulfonyloxy)phenyl]urea, N,N'-di-[4-(o-methoxybenzenesulfonyloxy)phenyl]urea, N,N'-di-[4-(m,p-dimethoxybenzenesulfonyloxy)phenyl]urea, N,N'-di-[4-(p-ethoxybenzenesulfonyloxy)phenyl]urea, N,N'-di-[4-(p-propoxybenzenesulfonyloxy)phenyl]urea, N,N'-di-[4-(p-butoxybenzenesulfonyloxy)phenyl]urea, N,N'-di-[4-(p-cumylbenzylsulfonyloxy)phenyl]urea, N,N'-di-[4-(p-cumylbenzenesulfonyloxy)phenyl]urea, N,N'-di-[4-(o-phenylbenzenesulfonyloxy)phenyl]urea, N,N'-di-[4-(p-phenylbenzenesulfonyloxy)phenyl]urea, N,N'-di-[4-(p-chlorobenzenesulfonyloxy)phenyl]urea, N-[4-(benzenesulfonyloxy)phenyl]-N'-[4-(p-toluenesulfonyloxy)phenyl]urea, N-[4-(benzenesulfonyloxy)phenyl]-N'-[4-(m-toluenesulfonyloxy)phenyl]urea, N-[4-(benzenesulfonyloxy)phenyl]-N'-[4-(o-toluenesulfonyloxy)phenyl]urea, N-[4-(benzenesulfonyloxy)phenyl]-N'-[4-(p-xylenesulfonyloxy)phenyl]urea, N-[4-(benzenesulfonyloxy)phenyl]-N'-[4-(mesitylenesulfonyloxy)phenyl]urea, N-[4-(benzenesulfonyloxy)phenyl]-N'-[4-(1-naphthalenesulfonyloxy)phenyl]urea, N-[4-(benzenesulfonyloxy)phenyl]-N'-[4-(2-naphthalenesulfonyloxy)phenyl]urea, N-[4-(benzenesulfonyloxy)phenyl]-N'-[4-(p-ethylbenzenesulfonyloxy)phenyl]urea, N-[4-(benzenesulfonyloxy)phenyl]-N'-[4-(p-methoxybenzenesulfonyloxy)phenyl]urea, N-[4-(benzenesulfonyloxy)phenyl]-N'-[4-(benzylsulfonyloxy)phenyl]urea, N-[4-(benzenesulfonyloxy)phenyl]-N'-[4-(ethanesulfonyloxy)phenyl]urea, N-[4-(p-toluenesulfonyloxy)phenyl]-N'-[4-(m-toluenesulfonyloxy)phenyl]urea, N-[4-(p-toluenesulfonyloxy)phenyl]-N'-[4-(o-toluenesulfonyloxy)phenyl]urea, N-[4-(p-toluenesulfonyloxy)phenyl]-N'-[4-(p-ethylbenzenesulfonyloxy)phenyl]urea, N-[4-(p-toluenesulfonyloxy)phenyl]-N'-[4-(p-methoxybenzenesulfonyloxy)phenyl]urea, N-[4-(p-toluenesulfonyloxy)phenyl]-N'-[4-(2-naphthalenesulfonyloxy)phenyl]urea, N-[4-(p-toluenesulfonyloxy)phenyl]-N'-[4-(benzylsulfonyloxy)phenyl]urea, N-[4-(p-toluenesulfonyloxy)phenyl]-N'-[4-(p-methylbenzylsulfonyloxy)phenyl]urea, N-[4-(p-toluenesulfonyloxy)phenyl]-N'-[4-(p-methoxybenzylsulfonyloxy)phenyl]urea, N-[4-(p-toluenesulfonyloxy)phenyl]-N'-[4-(methanesulfonyloxy)phenyl]urea, N-[4-(p-toluenesulfonyloxy)phenyl]-N'-[4-(propanesulfonyloxy)phenyl]urea, N-[4-(p-toluenesulfonyloxy)phenyl]-N'-[4-(butanesulfonyloxy)phenyl]urea, N,N'-di-[4-(benzylsulfonyloxy)phenyl]urea, N,N'-di-[4-(benzylsulfonyloxy)-3-methyl-phenyl]urea, N,N'-di-[4-(phenylethanesulfonyloxy)phenyl]urea, N,N'-di-[4-(phenylpropanesulfonyloxy)phenyl]urea, N,N'-di-[4-(p-methoxybenzylsulfonyloxy)phenyl]urea, N-[4-(benzylsulfonyloxy)phenyl]-N'-[4-(methanesulfonyloxy)phenyl]urea, N-[4-(benzylsulfonyloxy)phenyl]-N'-[4-(cthanesulfonyloxy)phenyl]urea, N,N'-di-[4-(methanesulfonyloxy)phenyl]urea, N,N'-di-[4-(methanesulfonyloxy)-3-methyl-phenyl]urea, N,N'-di-[4-(methanesulfonyloxy)-4-ethyl-phenyl]urea, N,N'-di-[4-(methanesulfonyloxy)-3-methyl-phenyl]urea, N,N'-di-[4-(methanesulfonyloxy)-3, 5-dimethyl-phenyl]urea, N,N'-di-[4-(ethanesulfonyloxy)phenyl]urea, N,N'-di-[4-(ethanesulfonyloxy)-3-methyl-phenyl]urea, N,N'-di-[4-(1-propanesulfonyloxy)phenyl]urea, N,N'-di-[4-(2-propanesulfonyloxy)phenyl]urea, N,N'-di-[4-(butanesulfonyloxy)phenyl]urea, N,N'-di-[4-(pentanesulfonyloxy)phenyl]urea, N,N'-di-[4-(hexanesulfonyloxy)phenyl]urea, N,N'-di-[4-(cyclohexanesulfonyloxy)phenyl]urea, N,N'-di-[4-(dodecanesulfonyloxy)phenyl]urea, N-[4-(methanesulfonyloxy)phenyl]-N'-[4-(ethanesulfonyloxy)phenyl]urea, N-[4-(methanesulfonyloxy)phenyl]-N'-[4-(propanesulfonyloxy)phenyl]urea, N,N'-di-[2-(benzenesulfonyloxy)phenyl]urea, N,N'-di-[2-(benzenesulfonyloxy)-4-methyl-phenyl]urea, N,N'-di-[2-(benzenesulfonyloxy)-4-ethyl-phenyl]urea, N,N'-di-[2-(benzenesulfonyloxy)-5-methyl-phenyl]urea, N,N'-di-[2-(benzenesulfonyloxy)-4-propyl-phenyl]urea, N,N'-di-[2-(o-toluenesulfonyloxy)phenyl]urea, N,N'-di-[2-(m-toluenesulfonyloxy)phenyl]urea, N,N'-di-[2-(p-toluenesulfonyloxy)phenyl]urea, N,N'-di-[2-(p-toluenesulfonyloxy)-4-methyl-phenyl]urea, N,N'-di-[2-(p-xylenesulfonyloxy)phenyl]urea, N,N'-di-[2-(m-xylenesulfonyloxy)phenyl]urea, N,N'-di-[2-(mesitylenesulfonyloxy)phenyl]urea, N,N'-di-[2-(1-naphthalenesulfonyloxy)phenyl]urea, N,N'-di-[2-(2-naphthalenesulfonyloxy)phenyl]urea, N,N'-di-[2-(p-ethylbenzenesulfonyloxy)phenyl]urea, N,N'-di-[2-(p-propylbenzenesulfonyloxy)phenyl]urea, N,N'-di-[2-(p-isopropylbenzenesulfonyloxy)phenyl]urea, N,N'-di-[2-(p-t-butylbenzenesulfonyloxy)phenyl]urea, N,N'-di-[2-(p-methoxybenzenesulfonyloxy)phenyl]urea, N,N'-di-[2-(m-methoxybenzenesulfonyloxy)phenyl]urea, N,N'-di-[2-(o-methoxybenzenesulfonyloxy)phenyl]urea, N,N'-di-[2-(m,p-dimethoxybenzenesulfonyloxy)phenyl]urea, N,N'-di-[2-(p-ethoxybenzenesulfonyloxy)phenyl]urea, N,N'-di-[2-(p-propoxybenzenesulfonyloxy)phenyl]urea, N,N'-di-[2-(p-butoxybenzenesulfonyloxy)phenyl]urea, N,N'-di-[2-(p-cumylbenzylsulfonyloxy)phenyl]urea, N,N'-di-[2-(p-cumylbenzenesulfonyloxy)phenyl]urea, N,N'-di-[2-(o-phenylbenzenesulfonyloxy)phenyl]urea, N,N'-di-[2-(p-phenylbenzenesulfonyloxy)phenyl]urea, N,N'-di-[2-(p-chlorobenzenesulfonyloxy)phenyl]urea, N-[2-(benzenesulfonyloxy)phenyl]-N'-[2-(p-toluenesulfonyloxy)phenyl]urea, N-[2-(benzenesulfonyloxy)phenyl]-N'-[2-(m-toluenesulfonyloxy)phenyl]urea, N-[2-(benzenesulfonyloxy)phenyl]-N'-[2-(o-toluenesulfonyloxy)phenyl]urea, N-[2-(benzenesulfonyloxy)phenyl]-N'-[2-(p-xylenesulfonyloxy)phenyl]urea, N-[2-(benzenesulfonyloxy)phenyl]-N'-[2-(mesitylenesulfonyloxy)phenyl]urea, N-[2-

(benzenesulfonyloxy)phenyl]-N'-[2-(1-naphthalenesulfonyloxy)phenyl]urea, N-[2-(benzenesulfonyloxy)phenyl]-N'-[2-(2-naphthalenesulfonyloxy)phenyl]urea, N-[2-(benzenesulfonyloxy)phenyl]-N'-[2-(p-ethylbenzenesulfonyloxy)phenyl]urea, N-[2-(benzenesulfonyloxy)phenyl]-N'-[2-(p-methoxybenzenesulfonyloxy)phenyl]urea, N-[2-(benzenesulfonyloxy)phenyl]-N'-[2-(benzylsulfonyloxy) phenyl]urea, N-[2-(benzenesulfonyloxy)phenyl]-N'-[2-(ethanesulfonyloxy)phenyl]urea, N-[2-(p-toluenesulfonyloxy)phenyl]-N'-[2-(m-toluenesulfonyloxy) phenyl]urea, N-[2-(p-toluenesulfonyloxy)phenyl]-N'-[2-(o-toluenesulfonyloxy)phenyl]urea, N-[2-(p-toluenesulfonyloxy)phenyl]-N'-[2-(p-ethylbenzenesulfonyloxy)phenyl]urea, N-[2-(p-toluenesulfonyloxy)phenyl]-N'-[2-(p-methoxybenzenesulfonyloxy)phenyl]urea, N-[2-(p-toluenesulfonyloxy)phenyl]-N'-[2-(2-naphthalenesulfonyloxy)phenyl]urea, N-[2-(p-toluenesulfonyloxy)phenyl]-N'-[2-(benzylsulfonyloxy)phenyl]urea, N-[2-(p-toluenesulfonyloxy)phenyl]-N'-[2-(p-methylbenzylsulfonyloxy)phenyl]urea, N-[2-(p-toluenesulfonyloxy)phenyl]-N'-[2-(p-methoxybenzylsulfonyloxy)phenyl]urea, N-[2-(p-toluenesulfonyloxy)phenyl]-N'-[2-(methanesulfonyloxy) phenyl]urea, N-[2-(p-toluenesulfonyloxy)phenyl]-N'-[2-(propanesulfonyloxy)phenyl]urea, N-[2-(p-toluenesulfonyloxy)phenyl]-N'-[2-(butanesulfonyloxy) phenyl]urea, N,N'-di-[2-(benzylsulfonyloxy)phenyl]urea, N,N'-di-[2-(benzylsulfonyloxy)-4-methyl-phenyl]urea, N,N'-di-[2-(phenylethanesulfonyloxy)phenyl]urea, N,N'-di-[2-(phenylpropanesulfonyloxy)phenyl]urea, N,N'-di-[2-(p-methoxybenzylsulfonyloxy)phenyl]urea, N-[2-(benzylsulfonyloxy)phenyl]-N'-[2-(propanesulfonyloxy)phenyl]urea, N-[2-(benzylsulfonyloxy)phenyl]-N'-[2-(p-methoxybenzylsulfonyloxy)phenyl]urea, N,N'-di-[2-(methanesulfonyloxy)phenyl]urea, N,N'-di-[2-(methanesulfonyloxy)-4-methyl-phenyl]urea, N,N'-di-[2-(methanesulfonyloxy)-4-ethyl-phenyl]urea, N,N'-di-[2-(methanesulfonyloxy)-5-methyl-phenyl]urea, N,N'-di-[2-(methanesulfonyloxy)-4,5-dimethyl-phenyl] urea, N,N'-di-[2-(ethanesulfonyloxy)phenyl]urea, N,N'-di-[2-(ethanesulfonyloxy)-4-methyl-phenyl]urea, N,N'-di-[2-(1-propanesulfonyloxy)phenyl]urea, N,N'-di-[2-(2-propanesulfonyloxy)phenyl]urea, N,N'-di-[2-(butanesulfonyloxy)phenyl]urea, N,N'-di-[2-(pentanesulfonyloxy)phenyl]urea, N,N'-di-[2-(hexanesulfonyloxy)phenyl]urea, N,N'-di-[2-(cyclohexanesulfonyloxy)phenyl]urea, N,N'-di-[2-(dodecanesulfonyloxy)phenyl]urea, N-[2-(ethanesulfonyloxy)phenyl]-N'-[2-(propanesulfonyloxy)phenyl]urea, N-[2-(ethanesulfonyloxy)phenyl]-N'-[2-(hexanesulfonyloxy)phenyl]urea, N-[3-(benzenesulfonyloxy)phenyl]-N'-[4-(benzenesulfonyloxy)phenyl]urea, N-[3-(p-toluenesulfonyloxy)phenyl]-N'-[4'-(p-toluenesulfonyloxy)phenyl]urea, N-[3-(m-toluenesulfonyloxy)phenyl]-N'-[4-(m-toluenesulfonyloxy)phenyl] urea, N-[3-(o-toluenesulfonyloxy)phenyl]-N'-[3-(o-toluenesulfonyloxy)phenyl]urea, N-[3-(p-xylenesulfonyloxy)phenyl]-N'-[4-(p-xylenesulfonyloxy) phenyl]urea, N-[3-(m-xylenesulfonyloxy)phenyl]-N'-[4-(m-xylenesulfonyloxy)phenyl]urea, N-[3-(mesitylenesulfonyloxy)phenyl]-N'-[4-(mesitylenesulfonyloxy)phenyl]urea, N-[3-(1-naphthalenesulfonyloxy)phenyl]-N'-[4-(1-naphthalenesulfonyloxy)phenyl]urea, N-[3-(2-naphthalenesulfonyloxy)phenyl]-N'-[3-(2-naphthalenesulfonyloxy)phenyl] urea, N-[3-(p-ethylbenzenesulfonyloxy)phenyl]-N'-[4-(p-ethylbenzenesulfonyloxy)phenyl]urea, N-[3-(p-propylbenzenesulfonyloxy)phenyl]-N'-[4-(p-propylbenzenesulfonyloxy) phenyl]urea, N-[3-(p-isopropylbenzenesulfonyloxy) phenyl]-N'-[4-(p-isopropylbenzenesulfonyloxy)phenyl] urea, N-[3-(p-t-butylbenzenesulfonyloxy)phenyl]-N'-[4-(p-t-butylbenzenesulfonyloxy)phenyl]urea, N-[3-(p-methoxybenzenesulfonyloxy)phenyl]-N'-[4-(p-methoxybenzenesulfonyloxy)phenyl]urea, N-[3-(m-methoxybenzenesulfonyloxy)phenyl]-N'-[4-(m-methoxybenzenesulfonyloxy)phenyl]urea, N-[3-(o-methoxybenzenesulfonyloxy)phenyl]-N'-[4-(o-methoxybenzenesulfonyloxy)phenyl]urea, N-[3-(m,p-dimethoxybenzenesulfonyloxy)phenyl]-N'-[4-(m,p-dimethoxybenzenesulfonyl oxy)phenyl]urea, N-[3-(p-ethoxybenzenesulfonyloxy)phenyl]-N'-[4-(p-ethoxybenzenesulfonyloxy)phenyl]urea, N-[3-(p-propoxybenzenesulfonyloxy)phenyl]-N'-[4-(p-propoxybenzenesulfonyloxy)phenyl]urea, N-[3-(p-butoxybenzenesulfonyloxy)phenyl]-N'-[4-(p-butoxybenzenesulfonyloxy)phenyl]urea, N-[3-(p-cumylbenzylsulfonyloxy)phenyl]-N'-[4-(p-cumylbenzylsulfonyloxy)phenyl]urea, N-[3-(p-cumylbenzenesulfonyloxy)phenyl]-N'-[4-(p-cumylbenzenesulfonyloxy) phenyl]urea, N-[3-(o-phenylbenzenesulfonyloxy)phenyl]-N'-[4-(o-phenylbenzenesulfonyloxy)phenyl]urea, N-[3-(p-phenylbenzenesulfonyloxy)phenyl]-N'-[4-(p-phenylbenzenesulfonyloxy)phenyl]urea, N-[3-(p-chlorobenzenesulfonyloxy)phenyl]-N'-[4-(p-chlorobenzenesulfonyloxy)phen yl]urea, N-[3-(benzenesulfonyloxy)phenyl]-N'-[4-(p-toluenesulfonyloxy)phenyl]urea, N-[3-(p-toluenesulfonyloxy)phenyl]-N'-[4-(o-toluenesulfonyloxy)phenyl]urea, N-[3-(p-toluenesulfonyloxy)phenyl]-N'-[4-(benzenesulfonyloxy) phenyl]urea, N-[3-(benzenesulfonyloxy)phenyl]-N'-[4-(ethanesulfonyloxy)phenyl]urea, N-[3-(p-toluenesulfonyloxy)phenyl]-N'-[4-(benzylsulfonyloxy) phenyl]urea, N-[3-(benzylsulfonyloxy)phenyl]-N'-[4-(benzylsulfonyloxy)phenyl]urea, N-[3-(phenylethanesulfonyloxy)phenyl]-N'-[4-(phenylethanesulfonyloxy)phenyl]urea, N-[3-(phenylpropanesulfonyloxy)phenyl]-N'-[4-(phenylpropanesulfonyloxy)phenyl]urea, N-[3-(p-methoxybenzylsulfonyloxy)phenyl]-N'-[4-(p-methoxybenzylsulfonyloxy)phenyl]urea, N-[3-(benzylsulfonyloxy)phenyl]-N'-[4-(butanesulfonyloxy)phenyl]urea, N-[3-(benzylsulfonyloxy)phenyl]-N'-[4-(p-methylbenzylsulfonyloxy)phenyl]urea, N-[3-(methanesulfonyloxy)phenyl]-N'-[4-(methanesulfonyloxy)phenyl]urea, N-[3-(ethanesulfonyloxy)phenyl]-N'-[4-(ethanesulfonyloxy)phenyl]urea, N-[3-(1-propanesulfonyloxy)phenyl]-N'-[4-(1-propanesulfonyloxy)phenyl]urea, N-[3-(2-propanesulfonyloxy)phenyl]-N'-[4-(2-propanesulfonyloxy)phenyl]urea, N-[3-(butanesulfonyloxy)phenyl]-N'-[4-(butanesulfonyloxy)phenyl]urea, N-[3-(pentanesulfonyloxy)phenyl]-N'-[4-(pentanesulfonyloxy) phenyl]urea, N-[3-(hexanesulfonyloxy)phenyl]-N'-[4-(hexanesulfonyloxy)phenyl]urea, N-[3-(cyclohexanesulfonyloxy)phenyl]-N'-[4-(cyclohexanesulfonyloxy)phenyl]urea, N-[3-(dodecanesulfonyloxy)phenyl]-N'-[4-(dodecanesulfonyloxy)phenyl]urea, N-[3-(methanesulfonyloxy)phenyl]-N'-[4-(ethanesulfonyloxy)phenyl]urea, N-[3-(methanesulfonyloxy)phenyl]-N'-[4-(butanesulfonyloxy)phenyl]urea, N-[2-(benzenesulfonyloxy)phenyl]-N'-[4-(benzenesulfonyloxy)phenyl]urea, N-[2-(p-toluenesulfonyloxy)phenyl]-N'-[4-(p-toluenesulfonyloxy)phenyl]urea, N-[2-(m-toluenesulfonyloxy)phenyl]-N'-[4-(m-toluenesulfonyloxy)phenyl]urea, N-[2-(o-toluenesulfonyloxy)phenyl]-N'-[4-(o-toluenesulfonyloxy)phenyl]urea, N-[2-(p-xylenesulfonyloxy)phenyl]-N'-[4-(p-xylenesulfonyloxy)phenyl]urea, N-[2-(m-xylenesulfonyloxy)phenyl]-N'-[4-(m-xylenesulfonyloxy)phenyl]urea, N-[2-(mesitylenesulfonyloxy)phenyl]-N'-[4-(mesitylenesulfonyloxy)phenyl]urea, N-[2-(1-naphthalenesulfonyloxy)phenyl]-N'-[4-(1-naphthalenesulfonyloxy)phenyl]urea, N-[2-(2-naphthalenesulfonyloxy)phenyl]-N'-[4-(2-naphthalenesulfonyloxy)phenyl]urea, N-[2-(p-ethylbenzenesulfonyloxy)phenyl]-N'-[4-(p-ethylbenzenesulfonyloxy)phenyl]urea, N-[2-(p-propylbenzenesulfonyloxy)phenyl]-N'-[4-(p-propylbenzenesulfonyloxy)phenyl]urea, N-[2-(p-isopropylbenzenesulfonyloxy)phenyl]-N'-[4-(p-isopropylbenzenesulfonyloxy)phenyl]urea, N-[2-(p-t-butylbenzenesulfonyloxy)phenyl]-N'-[4-(p-t-butylbenzenesulfonyloxy)phenyl]urea, N-[2-(p-methoxybenzenesulfonyloxy)phenyl]-N'-[4-(p-methoxybenzenesulfonyloxy)phenyl]urea, N-[2-(m-methoxybenzenesulfonyloxy)phenyl]-N'-[4-(m-methoxybenzenesulfonyloxy)phenyl]urea, N-[2-(o-methoxybenzenesulfonyloxy)phenyl]-N'-[4-(o-methoxybenzenesulfonyloxy)phenyl]urea, N-[2-(m,p-dimethoxybenzenesulfonyloxy)phenyl]-N'-[4-(m,p-dimethoxybenzenesulfonyl oxy)phenyl]urea, N-[2-(p-ethoxybenzenesulfonyloxy)phenyl]-N'-[4-(p-ethoxybenzenesulfonyloxy)phenyl]urea, N-[2-(p-propoxybenzenesulfonyloxy)phenyl]-N'-[4-(p-propoxybenzenesulfonyloxy)phenyl]urea, N-[2-(p-butoxybenzenesulfonyloxy)phenyl]-N'-[4-(p-butoxybenzenesulfonyloxy)phenyl]urea, N-[2-(p-cumylbenzylsulfonyloxy)phenyl]-N'-[4-(p-cumylbenzylsulfonyloxy)phenyl]urea, N-[2-(p-cumylbenzenesulfonyloxy)phenyl]-N'-[4-(p-cumylbenzenesulfonyloxy)phenyl]urea, N-[2-(o-phenylbenzenesulfonyloxy)phenyl]-N'-[4-(o-phenyl)benzenesulfonyloxyphenyl]urea, N-[2-(p-phenylbenzenesulfonyloxy)phenyl]-N'-[4-(p-phenylbenzenesulfonyloxy)phenyl]urea, N-[2-(p-chlorobenzenesulfonyloxy)phenyl]-N'-[4-(p-chlorobenzenesulfonyloxy)phenyl]urea, N-[2-(ethanesulfonyloxy)phenyl]-N'-[4-(benzenesulfonyloxy)phenyl]urea, N-[2-(ethanesulfonyloxy)phenyl]-N'-[4-(p-toluenesulfonyloxy)phenyl]urea, N-[2-(benzenesulfonyloxy)phenyl]-N'-[4-(cthanesulfonyloxy)phenyl]urea, N-[2-(benzenesulfonyloxy)phenyl]-N'-[4-(benzylsulfonyloxy)phenyl]urea, N-[2-(benzenesulfonyloxy)phenyl]-N'-[4-(p-toluenesulfonyloxy)phenyl]urea, N-[2-(benzenesulfonyloxy)phenyl]-N'-[4-(o-toluenesulfonyloxy)phenyl]urea, N-[2-(benzenesulfonyloxy)phenyl]-N'-[4-(p-ethylbenzenesulfonyloxy)phenyl]urea, N-[2-(benzenesulfonyloxy)phenyl]-N'-[4-(p-methoxybenzenesulfonyloxy)phenyl]urea, N-[2-(p-toluenesulfonyloxy)phenyl]-N'-[4-[ benzenesulfonyloxy]phenyl]urea, N-[2-(p-toluenesulfonyloxy)phenyl]-N'-[4-(mesitylenesulfonyloxy)phenyl]urea, N-[2-(p-toluenesulfonyloxy)phenyl]-N'-[4-(1-naphthalenesulfonyloxy)phenyl]urea, N-[2-(benzylsulfonyloxy)phenyl]-N'-[4-(benzylsulfonyloxy)phenyl]urea, N-[2-(phenylethanesulfonyloxy)phenyl]-N'-[4-(phenylethanesulfonyloxy)phenyl]urea, N-[2-(phenylpropanesulfonyloxy)phenyl]-N'-[4-(phenylpropanesulfonyloxy)phenyl]urea, N-[2-(p-methoxybenzylsulfonyloxy)phenyl]-N'-[4-(p-methoxybenzylsulfonyloxy)phenyl]urea, N-[2-(ethanesulfonyloxy)phenyl]-N'-[4-(benzylsulfonyloxy)phenyl]urea, N-[2-(benzylsulfonyloxy)phenyl]-N'-[4-(methanesulfonyloxy)phenyl]urea, N-[2-(benzylsulfonyloxy)phenyl]-N'-[4-(butanesulfonyloxy)phenyl]urea, N-[2-(methanesulfonyloxy)phenyl]-N'-[4-(methanesulfonyloxy)phenyl]urea, N-[2-(ethanesulfonyloxy)phenyl]-N'-[4-(ethanesulfonyloxy)phenyl]urea, N-[2-(1-propanesulfonyloxy)phenyl]-N'-[4-(1-propanesulfonyloxy)phenyl]urea, N-[2-(2-propanesulfonyloxy)phenyl]-N'-[4-(2-propanesulfonyloxy)phenyl]urea, N-[2-(butanesulfonyloxy)phenyl]-N'-[4-(butanesulfonyloxy)phenyl]urea, N-[2-(pentanesulfonyloxy)phenyl]-N'-[4-(pentanesulfonyloxy)phenyl]urea, N-[2-(hexanesulfonyloxy)phenyl]-N'-[4-(hexanesulfonyloxy)phenyl]urea, N-[2-(cyclohexanesulfonyloxy)phenyl]-N'-[4-(cyclohexanesulfonyloxy)phenyl]urea, N-[2-(dodecanesulfonyloxy)phenyl]-N'-[4-(dodecanesulfonyloxy)phenyl]urea, N-[2-(methanesulfonyloxy)phenyl]-N'-[4-(propanesulfonyloxy)phenyl]urea, N-[2-(cthanesulfonyloxy)phenyl]-N'-[4-(propanesulfonyloxy)phenyl]urea, N-[2-(cthanesulfonyloxy)phenyl]-N'-[4-(butanesulfonyloxy)phenyl]urea, N-[2-(benzenesulfonyloxy)phenyl]-N'-[3-(benzenesulfonyloxy)phenyl]urea, N-[2-(p-toluenesulfonyloxy)phenyl]-N'-[3-(p-toluenesulfonyloxy)phenyl]urea, N-[2-(m-toluenesulfonyloxy)phenyl]-N'-[3-(m-toluenesulfonyloxy)phenyl]urea, N-[2-(o-toluenesulfonyloxy)phenyl]-N'-[3-(o-toluenesulfonyloxy)phenyl]urea, N-[2-(p-xylenesulfonyloxy)phenyl]-N'-[3-(p-xylenesulfonyloxy)phenyl]urea, N-[2-(m-xylenesulfonyloxy)phenyl]-N'-[3-(m-xylenesulfonyloxy)phenyl]urea, N-[2-(mesitylenesulfonyloxy)phenyl]-N'-[3-(styrenesulfonyloxy)phenyl]urea, N-[2-(1-naphthalenesulfonyloxy)phenyl]-N'-[3-(1-naphthalenesulfonyloxy)phenyl]urea, N-[2-(2-naphthalenesulfonyloxy)phenyl]-N'-[3-(2-naphthalenesulfonyloxy)phenyl]urea, N-[2-(p-ethylbenzenesulfonyloxy)phenyl]-N'-[3-(p-ethylbenzenesulfonyloxy)phenyl]urea, N-[2-(p-propylbenzenesulfonyloxy)phenyl]-N'-[3-(p-propylbenzenesulfonyloxy)phenyl]urea, N-[2-(p-isopropylbenzenesulfonyloxy)phenyl]-N'-[3-(p-isopropylbenzenesulfonyloxy)phenyl]urea, N-[2-(p-t-butylbenzenesulfonyloxy)phenyl]-N'-[3-(p-t-butylbenzenesulfonyloxy)phenyl]urea, N-[2-(p-methoxybenzenesulfonyloxy)phenyl]-N'-[3-(p-methoxybenzenesulfonyloxy)phenyl]urea, N-[2-(m-methoxybenzenesulfonyloxy)phenyl]-N'-[3-(m-methoxybenzenesulfonyloxy)phenyl]urea, N-[2-(o-methoxybenzenesulfonyloxy)phenyl]-N'-[3-(o-methoxybenzenesulfonyloxy)phenyl]urea, N-[2-(m,p-dimethoxybenzenesulfonyloxy)phenyl]-N'-[3-(m,p-dimethoxybenzenesulfonyl oxy)phenyl]urea, N-[2-(p-ethoxybenzenesulfonyloxy)phenyl]-N'-[3-(p-ethoxybenzenesulfonyloxy)phenyl]urea, N-[2-(p-propoxybenzenesulfonyloxy)phenyl]-N'-[3-(p-propoxybenzenesulfonyloxy)phenyl]urea, N-[2-(p-butoxybenzenesulfonyloxy)phenyl]-N'-[3-(p-butoxybenzenesulfonyloxy)phenyl]urea, N-[2-(p-cumylbenzylsulfonyloxy)phenyl]-N'-[3-(p-cumylbenzylsulfonyloxy)phenyl]urea, N-[2-(p-cumylbenzenesulfonyloxy)phenyl]-N'-[3-(p-cumylbenzenesulfonyloxy)phenyl]urea, N-[2-(o-phenylbenzenesulfonyloxy)phenyl]-

N'-[3-(o-phenylbenzenesulfonyloxy)phenyl]urea, N-[2-(p-phenylbenzenesulfonyloxy)phenyl]-N'-[3-(p-phenylbenzenesulfonyloxy)phenyl]urea, N-[2-(p-chlorobenzenesulfonyloxy)phenyl]-N'-[3-(p-chlorobenzenesulfonyloxy)phenyl]urea, N-[2-(ethanesulfonyloxy)phenyl]-N'-[3-(benzenesulfonyloxy)phenyl]urea, N-[2-(cthanesulfonyloxy)phenyl]-N'-[3-(p-toluenesulfonyloxy)phenyl]urea, N-[2-(benzenesulfonyloxy)phenyl]-N'-[3-(ethanesulfonyloxy)phenyl]urea, N-[2-(benzenesulfonyloxy)phenyl]-N'-[3-(benzylsulfonyloxy)phenyl]urea, N-[2-(benzenesulfonyloxy)phenyl]-N'-[3-(p-toluenesulfonyloxy)phenyl]urea, N-[2-(benzenesulfonyloxy)phenyl]-N'-[3-(o-toluenesulfonyloxy)phenyl]urea, N-[2-(benzenesulfonyloxy)phenyl]-N'-[3-(p-ethylbenzenesulfonyloxy)phenyl]urea, N-[2-(benzenesulfonyloxy)phenyl]-N'-[3-(p-methoxybenzenesulfonyloxy)phenyl]urea, N-[2-(p-toluenesulfonyloxy)phenyl]-N'-[3-(benzenesulfonyloxy)phenyl]urea, N-[2-(p-toluenesulfonyloxy)phenyl]-N'-[3-(mesitylenesulfonyloxy)phenyl]urea, N-[2-(p-toluenesulfonyloxy)phenyl]-N'-[3-(1-naphthalenesulfonyloxy)phenyl]urea, N-[2-(benzylsulfonyloxy)phenyl]-N'-[3-(benzylsulfonyloxy)phenyl]urea, N-[2-(phenylethanesulfonyloxy)phenyl]-N'-[3-(phenylethanesulfonyloxy)phenyl]urea, N-[2-(phenylpropanesulfonyloxy)phenyl]-N'-[3-(phenylpropanesulfonyloxy)phenyl]urea, N-[2-(p-methoxybenzylsulfonyloxy)phenyl]-N'-[3-(p-methoxybenzylsulfonyloxy)phenyl]urea, N-[2-(ethanesulfonyloxy)phenyl]-N'-[3-(benzylsulfonyloxy)phenyl]urea, N-[2-(benzylsulfonyloxy)phenyl]-N'-[3-(methanesulfonyloxy)phenyl]urea, N-[2-(benzylsulfonyloxy)phenyl]-N'-[3-(butanesulfonyloxy)phenyl]urea, N-[2-(methanesulfonyloxy)phenyl]-N'-[3-(methanesulfonyloxy)phenyl]urea, N-[2-(ethanesulfonyloxy)phenyl]-N'-[3-(ethanesulfonyloxy)phenyl]urea, N-[2-(1-propanesulfonyloxy)phenyl]-N'-[3-(1-propanesulfonyloxy)phenyl]urea, N-[2-(2-propanesulfonyloxy)phenyl]-N'-[3-(2-propanesulfonyloxy)phenyl]urea, N-[2-(butanesulfonyloxy)phenyl]-N'-[3-(butanesulfonyloxy)phenyl]urea, N-[2-(pentanesulfonyloxy)phenyl]-N'-[3-(pentanesulfonyloxy)phenyl]urea, N-[2-(hexanesulfonyloxy)phenyl]-N'-[3-(hexanesulfonyloxy)phenyl]urea, N-[2-(cyclohexanesulfonyloxy)phenyl]-N'-[3-(cyclohexanesulfonyloxy)phenyl]urea, N-[2-(dodecanesulfonyloxy)phenyl]-N'-[3-(dodecanesulfonyloxy)phenyl]urea, N-[2-(methanesulfonyloxy)phenyl]-N'-[3-(propanesulfonyloxy)phenyl]urea, N-[2-(ethanesulfonyloxy)phenyl]-N'-[3-(propanesulfonyloxy)phenyl]urea, and N-[2-(ethanesulfonyloxy)phenyl]-N'-[3-(butanesulfonyloxy)phenyl]urea.

<Production Method of Compound Represented by General Formula (1)>

The compound represented by General Formula (1) can be synthesized through a reaction between a compound represented by General Formula (4) and an aromatic amine compound represented by General Formula (5).

Moreover, the compound represented by General Formula (1) can be synthesized through a reaction between a compound represented by General Formula (6) and an aromatic amine compound represented by General Formula (7).

[Chem.3]

General Formula (4)

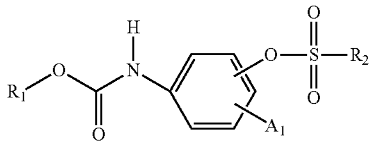

[Chem.4]

General Formula (5)

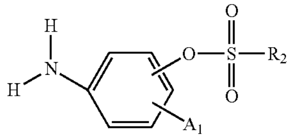

In General Formulae (4) and (5), $R_1$ is an alkyl group or an aryl group; $A_1$ is a hydrogen atom or a C1-4 alkyl group, where two or more $A_1$ may be identical to or different from each other; and $R_2$ is a C1-12 straight-chain, branched-chain, or alicyclic alkyl group, or a C7-12 aralkyl group or C6-12 aryl group that is unsubstituted or substituted with a C1-12 alkyl group, a C1-12 alkoxy group, a C6-12 aryl group or a halogen atom.

[Chem.5]

General Formula (6)

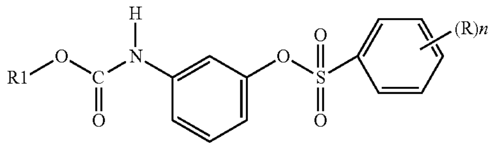

[Chem.6]

General Formula (7)

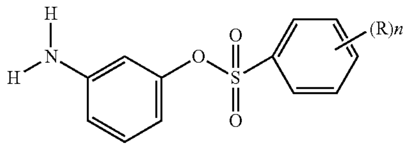

In General Formulae (6) and (7), $R_1$ is an alkyl group or an aryl group; R is an alkyl group; and n is an integer of from 0 through 3.

For example, the compound represented by General Formula (1) can be synthesized by the following method.

$$3\text{-}[(R)_n\text{-}PhSO_3]\text{-}Ph\text{-}NH_2/\text{deoxidizing agent}+XCOOR_1 \rightarrow 3\text{-}[(R)_n\text{-}PhSO_3]\text{-}Ph\text{-}NHCOOR_1+HX\cdot\text{deoxidizing agent} \quad \text{(Step 1)}$$

$$3\text{-}[(R)_n\text{-}PhSO_3]\text{-}Ph\text{-}NHCOOR_1+3\text{-}[(R)_n\text{-}PhSO_3]\text{-}Ph\text{-}NH_2/\text{base} \rightarrow 3\text{-}\{[(R)_n\text{-}PhSO_3]\text{-}Ph\text{-}NH\}_2{=}CO+R1OH \quad \text{(Step 2)}$$

In the formulae above, $R_1$ is an alkyl group, or an aryl group, R is an alkyl group, Ph is a phenyl group, and n is an integer of from 0 through 3.

$XCOOR_1$ used in Step 1 of the above-described synthesis method is halogenated carboxylic acid ester, or carboxylic acid diester, where X is chloro-, bromo-, OMe, OEt, OPro, or OPh, and $R_1$ is a Me group, an Et group, a Pro group, or a Ph group. The Me group is a methyl group, the Et group is an ethyl group, the Pro group is a propyl group, and the Ph group is a phenyl group. $XCOOR_1$ is particularly preferably monochloromethyl carbonate, monochloroethyl carbonate, monochlorophenyl carbonate, diethyl carbonate, or diphenyl carbonate.

Examples of the alkyl group of $R_1$ and the alkyl group of R are identical to the examples of the alkyl group of the above-described R.

For the reaction, a deoxidizing agent and base, such as organic base and inorganic base, may be used.

Examples of the inorganic base include LiOH, NaOH, KOH, $NaHCO_3$, $KHCO_3$, $Na_2CO_3$, $K_2CO_3$, MeONa, and EtONa.

Examples of the organic base include organic base, such as trimethylamine, triethylamine, tributylamine, pyridine, N,N-dimethylpyridine, and 1,8-diazabicyclo[5,4,0]undece-7-ene (DBU). The base is preferably $K_2CO_3$, triethylamine, pyridine, N,N-dimethylpyridine, or 1,8-diazabicyclo[5,4,0] undece-7-ene (DBU).

3-$[(R)_n$-$PhSO_3]$-Ph-$NH_2$ can be also synthesized by directly O-sulfonating 3-hydroxyaniline. Alternatively, 3-$[(R)_n$-$PhSO_3]$-Ph-$NH_2$ can be easily obtained by O-sulfonating a nitrophenol compound, followed by reducing a nitro group.

Examples of 3-$[(R)_n$-$PhSO_3]$-Ph-$NH_2$ include 3-benzenesulfonyloxyaniline, 3-(p-toluene)sulfonyloxyaniline, 3-(m-toluene)sulfonyloxyaniline, 3-(o-toluene)sulfonyloxyaniline, 3-(p-xylene)sulfonyloxyaniline, and 3-mesitylenesulfonyloxyaniline. Preferable as 3-$[(R)_n$-$PhSO_3]$-Ph-$NH_2$ is 3-benzenesulfonyloxyaniline, or 3-(p-toluene)sulfonyloxyaniline.

Typically, an aprotic solvent may be used as a reaction solvent, and the reaction may be performed at a reaction temperature of from 0° C. through 180° C. In the present disclosure, the reaction temperature is for example in the range of from 0° C. through 180° C., preferably from 10° C. through 100° C. The reaction solvent and the reaction temperature are appropriately selected depending on a boiling point of the solvent and stability of a reaction product.

Examples of the aprotic solvent include: aromatic hydrocarbon, such as benzene, toluene, xylene, and mesitylene; halogenated hydrocarbon, such as dichloromethane, chloroform, dichloroethane, and chlorobenzene; acetic acid ester, such as ethyl acetate, propyl acetate, butyl acetate, phenyl acetate, and benzyl acetate; ether compounds, such as diethyl ether, dimethoxyethane, diethoxyethane, diethylene glycol dimethyl ether, dioxane, tetrahydrofuran, and anisole; ketone compounds, such as acetone, methyl ethyl ketone, and methyl isobutyl ketone; acetonitrile; dimethyl sulfoamide, dimethyl sulfoxide; and dimethylimidazolidine.

Step 2 is performed by reacting 3-$[(R)_n$-$PhSO_3]$-Ph-NHCOOR obtained in Step 1 with 3-$[(R)_n$-$PhSO_3]$-Ph-$NH_2$ in the presence of base.

The base, the reaction solvent, and the reaction temperature used in Step 2 are identical to the reaction conditions used in Step 1.

In order to simplify the reaction processes, Step 1 and Step 2 can be simultaneously performed by using 2 equivalent or greater 3-$[(R)_n$-$PhSO_3]$-Ph-$NH_2$.

In order to introduce a urea group, various methods for introducing a urea group have been proposed. For example, proposed is a method for forming a urea group through introduction of carbon monoxide using a metal catalyst (e.g., palladium, and molybdenum) or carbonylbisimidazole, but the method proposed is not necessarily industrially applicable because a catalyst or reagent is expensive, or processes are complicated.

N,N'-diphenylurea derivative represented by General Formulae (1) to (3) may be also synthesized by reacting dihydroxydiphenylurea represented by General Formula (8) below with a sulfonating agent represented by General Formula (9) below in the presence of an aprotic solvent. In the case where a symmetric compound is synthesized, particularly, the above-described production method including synthesizing dihydroxydiphenylurea, followed by O-sulfonating is the most versatile and also economical.

[Chem.7]

General Formula (8)

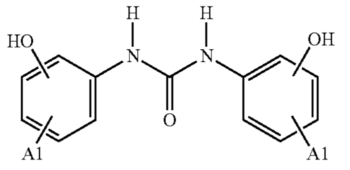

In General Formula (8), $A_1$ is a hydrogen atom or C1-4 alkyl group, where two or more $A_1$ may be identical to or different from each other.

[Chem.8]

General Formula (9)

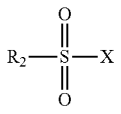

In General Formula (9), $R_2$ is a C1-12 straight-chain, branched-chain, or alicyclic alkyl group, or a C7-12 aralkyl group or C6-12 aryl group that is unsubstituted or substituted with a C1-12 alkyl group, a C1-12 alkoxy group, a C6-12 aryl group, or a halogen atom; and X is a halogen atom.

In addition, the above-described production method can perform a production process of dihydroxydiphenyl urea through a reaction in a smooth slurry state by selecting a reaction solvent, and a reaction of the following step can be continuously carried out without separating the dihydroxydiphenylurea. Therefore, the above-described production method is industrially advantageous.

The N,N'-diphenylurea derivative represented by General Formulae (1) to (3) can be also synthesized by reacting an aminophenol compound represented by General Formula (8-1) with urea in the presence of an aprotic solvent, followed by reacting with a sulfonating agent represented by General Formula (9). The production step of dihydroxydiphenylurea is smoothly progressed by performing the step where the aminophenol compound represented by General Formula (8-1) is reacted with urea in the presence of an aprotic solvent, and the reaction is carried out in the slurry state. Moreover, it is not necessary to separate the dihydroxydiphenylurea to proceed with the step for reacting the dihydroxydiphenylurea with the sulfonating agent represented by General Formula (9).

[Chem.9]

General Formula (8-1)

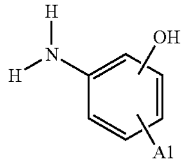

In General Formula (8-1), A1 is a hydrogen atom, or a C1-4 alkyl group.

The reaction for synthesizing dihydroxydiphenyl urea from amino phenol and urea is performed in an aprotic solvent at a reaction temperature of from 80° C. through 200° C., preferably from 125° C. through 180° C.

Examples of the amino phenol include 2-aminophenol, 3-aminophenol, 4-aminophenol, 2-amino-5-methylphenol, 2-amino-4-methylphenol, 2-amino-6-methylphenol, 2-amino-4,5-dimethylphenol, 2-methyl-5-aminophenol, 3-methyl-5-aminophenol, 2,3-dimethyl-5-aminophenol, 2,4-dimethyl-5-aminophenol, 2,6-dimethyl-5-aminophenol, 3,4-dimethyl-5-aminophenol, 2-methyl-4-aminophenol, 3-methyl-4-aminophenol, and 2,6-dimethyl-4-aminophenol.

Examples of the aprotic solvent include: hydrocarbon, such as tetralin, benzene, toluene, xylene, and mesitylene; halogenated hydrocarbon, such as trichloroethylene, chlorobenzene, and dichlorobenzene; acetic acid ester, such as ethyl acetate, propyl acetate, isobutyl acetate, butyl acetate, isoamyl acetate, amyl acetate, hexyl acetate, phenyl acetate, and benzyl acetate; an ether compound, such as diethoxyethane, diethylene glycol dimethyl ether, triethylene glycol dimethyl ether, dioxane, tetrahydrofuran, and anisole; a ketone compound, such as methyl ethyl ketone, methyl isobutyl ketone, diisobutyl ketone, acetophenone, and benzophenone; tertiary amine, such as tributylamine, pyridine, dimethylpyridine, and diazabicycloundecene; and an aprotonic polar solvent, such as acetonitrile, benzonitrile, dimethylformamide, dimethylsulfoxide, dimethylimidazolidine, and dimethylacetamide. The above-listed solvents may be used alone or in combination.

The solvent is preferably an aprotonic aqueous solvent having a boiling point of 110° C. or greater, and particularly preferably acetic acid ester having a boiling point higher than a boiling point of butyl acetate, or aromatic hydrocarbon, such as toluene, and xylene.

Examples of a processing method after completing the reaction include: (1) a method where the reaction liquid is cooled and filtered to separate dihydroxydiphenylurea, and the separated dihydroxydiphenylurea is provided to the following reaction; and (2) a method where the reaction liquid cooled to a temperature for the following reaction, and the cooled reaction liquid is provided to the following reaction without separating the dihydroxydiphenylurca.

Next, the O-sulfonation reaction of dihydroxydiphenylurea can be performed by dripping a sulfonating agent to a reaction solution including dihydroxydiphenylurca, a deoxidizing agent, and an aprotic solvent. Alternatively, the O-sulfonation reaction of dihydroxydiphenylurca may be performed by dripping a deoxidizing agent to a reaction solution including dihydroxydiphenylurea, a sulfonating agent, and an aprotic solvent.

As a reaction temperature of the O-sulfonation reaction, the O-sulfonation reaction is performed at a temperature ranging from 0 to 200° C. in the presence of a deoxidizing agent, and is preferably performed at a temperature of from 10° C. through 150° C.

The O-sulfonation is performed using a halogenated sulfonyl compound etc., and the halogenated sulfonyl compound is preferably a sulfonyl chloride compound. Examples thereof include ethanesulfonyl chloride, ethanesulfonyl chloride, n-propanesulfonyl chloride, i-propanesulfonyl chloride, butanesulfonyl chloride, benzylsulfonyl chloride, benzene sulfonyl chloride, p-toluene sulfonyl chloride, o-toluene sulfonyl chloride, p-xylene sulfonyl chloride, mesitylene sulfonyl chloride, p-ethylbenzene sulfonyl chloride, p-methoxybenzene sulfonyl chloride, p-chlorobenzene sulfonyl chloride, 1-naphthalene sulfonyl chloride, and 2-naphthalene sulfonyl chloride.

Examples of the deoxidizing agent include: organic base, such as trimethylamine, triethylamine, tributylamine, pyridine, and dimethylaminopyridine; inorganic base, such as lithium hydroxide, sodium hydroxide, potassium hydroxide, calcium hydroxide, potassium bicarbonate, sodium bicarbonate, sodium carbonate, potassium carbonate, and calcium carbonate; and base, such as sodium hydride, sodium methoxide, and sodium ethoxide.

The solvent used in the O-sulfonation step of the dihydroxydiphenylurea is an aprotic solvent. The solvent is particularly preferably acetic acid ester, such as butyl acetate, isoamyl acetate, amyl acetate, and hexyl acetate, or aromatic hydrocarbon, such as toluene, xylene, and mesitylene. As the reaction solvent, the solvent used in the previous step may be used alone, or a solvent mixture of two or more solvents, or a two-phase solvent system including water and a water-insoluble aprotic solvent may be used.

When the reaction is performed, the solvent and the reaction temperature may be appropriately selected according to the reaction method considering a boiling point of the solvent, physical properties of the sulfonating agent, and stability of the reaction product.

The reaction liquid after completing the reaction may be washed by adding water to wash and remove the deoxidizing agent.

In the case where high purity is desired as a quality of the reaction product, washing of crystals or recrystallization may be performing using aromatic hydrocarbons (e.g., benzene, and toluene), acetic acid esters (e.g., ethyl acetate, and isoamyl acetate), or alcohols (e.g., methyl alcohol, ethyl alcohol, and isopropyl alcohol).

An amount of the color developer is not particularly limited and may be appropriately selected depending on the intended purpose. The amount of the color developer is preferably 1 part by mass or greater but 20 parts by mass or less, and more preferably 2 parts by mass or greater but 10 parts by mass or less, relative to 1 part by mass of the leuco dye.

<<Leuco Dye>>

The leuco dye is not particularly limited, and may be appropriately selected from leuco dyes used for thermosensitive recording media depending on the intended purpose. Examples of the leuco dye include leuco compounds, such as triphenylmethane-based dyes, fluoran-based dyes, phenothiazine-based dyes, auramine-based dyes, spiropyran-based dyes, and indolinophthalide-based dyes.

The leuco dye is not particularly limited and may be appropriately selected depending on the intended purpose. Examples thereof include 3,3-bis(p-dimethylaminophenyl)-phthalide, 3,3-bis(p-dimethylaminophenyl)-6-dimethylaminophthalide (also known as crystal violet lactone), 3,3-bis (p-dimethylaminophenyl)-6-diethylaminophthalide, 3,3-bis (p-dimethylaminophenyl)-6-chlorophthalide, 3,3-bis(p-dibutylaminophenyl)phthalide, 3-cyclohexylamino-6-chlorofluoran, 3-dimethylamino-5,7-dimethylfluoran, 3-diethylamino-7-chlorofluoran, 3-diethylamino-7-methylfluoran, 3-diethylamino-7,8-benzfluoran, 3-diethylamino-6-methyl-7-chlorofluoran, 3-(N-p-tolyl-N-ethylamino)-6-methyl-7-anilinofluoran, 2-{ N-(3'-trifluoromethylphenyl) amino}-6-diethylaminofluoran, 2-{3,6-bis(diethylamino)-9-(o-chloroanilino)xanthyl lactam benzoate}, 3-diethylamino-6-methyl-7-(m-trichloromethylanilino)fluoran, 3-diethylamino-7-(o-chloroanilino)fluoran, 3-pyrrolidino-6-methyl-7-anilinofluoran, 3-di-n-butylamino-7-o-chloroanilino)fluoran, 3-N-methyl-N,n-amylamino-6-methyl-7-anilinofluoran, 3-N-methyl-N-cyclohexylamino-6-methyl-7-anilinofluoran, 3-diethylamino-6-methyl-7-anilinofluoran, 3-(N,N-diethylamino)-5-methyl-7-(N,N-dibenzylamino) fluoran, benzoyl leuco methylene blue, 6'-chloro-8'-methoxy-benzoindolino-spiropyran, 6'-bromo-3'-methoxy-benzoindolino-spiropyran, 3-(2'-hydroxy-4'-dimethylaminophenyl)-3-(2'-methoxy-5'-chlorophenyl) phthalide, 3-(2'-hydroxy-4'-dimethylaminophenyl)-3-(2'-methoxy-5'-nitrophenyl)phthalide, 3-(2'-hydroxy-4'-diethylaminophenyl)-3-(2'-methoxy-5'-methylphenyl) phthalide, 3-(2'-methoxy-4'-dimethylaminophenyl)-3-(2'-hydroxy-4'-chloro-5'-methylphenyl)phthalide, 3-(N-ethyl-N-tetrahydrofurfuryl)amino-6-methyl-7-anilinofluoran, 3-N-ethyl-N-(2-ethoxypropyl)amino-6-methyl-7-anilinofluoran, 3-N-methyl-N-isobutyl-6-methyl-7-anilinofluoran, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino)fluoran, 3-pyrrolidino-7-(di-p-chlorophenyl)methylaminofluoran, 3-diethylamino-5-chloro-7-(α-phenylethylamino) fluoran, 3-(N-ethyl-p-toluidino)-7-(α-phenylethylamino) fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-n-butylanilino)fluoran, 3-di-n-butylamino-6-methyl-7-anilinofluoran, 3,6-bis(dimethylamino)fluorenespiro(9,3')-6'-dimethylaminophthalide, 3-(N-benzyl-N-cyclohexylamino)-5,6-benzo-7-α-naphthylamino-4'-bromofluoran, 3-diethylamino-6-chloro-7-anilinofluoran, 3-diethylamino-6-methyl-7-mesitidino-4',5'-benzofluoran, 3-N-methyl-N-isopropyl-6-methyl-7-anilinofluoran, 3-N-ethyl-N-isoamyl-6-methyl-7-anilinofluoran, 3-diethylamino-6-methyl-7-(2',4'-dimethylanilino)fluoran, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino)fluoran, 3-pyrrolidino-7-(di-p-chlorophenyl)methylaminofluoran, 3-diethylamino-5-chloro-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-N-butylanilino)fluoran, 3,6-bis (dimethylamino)fluorenespiro(9,3')-6'-dimethylaminophthalide, 3-(N-benzyl-N-cyclohexylamino)-5,6-benzo-7-α-naphthylamino-4'-bromofluoran, 3-diethylamino-6-chloro-7-anilinofluoran, 3-N-ethyl-N-(–2-ethoxypropyl)amino-6-methyl-7-anilinofluoran, 3-N-ethyl-N-tetrahydrofurfurylamino-6-methyl-7-anilinofluoran, 3-diethylamino-6-methyl-7-mesitidino-4',5'-benzofluoran, 3-p-dimethylaminophenyl)-3-{1,1-bis(p-dimethylaminophenyl)ethylen-2-yl}phthalide, 3-(p-dimethylaminophenyl)-3-{1,1-bis(p-dimethylaminophenyl) ethylen-2-yl}-6-dimethylaminophthalide, 3-(p-dimethylaminophenyl)-3-(1-p-dimethylaminophenyl-1-phenylethylen-2-yl)phthalide, 2-ortho-chloroanilino-6-diethylaminofluoran, 2-anilino-3-methyl-6-diethylaminofluoran, 2-anilino-3-methyl-6-(N-ethyl-N-p-tolyl)aminofluoran, 3-N-cyclohexyl-N-methylamino-6-methyl-7-anilinofluoran, 3-(p-dimethylaminophenyl)-3-(1-p-dimethylaminophenyl-1-p-chlorophenylethylen-2-yl)-6-dimethylaminophthalide, 3-(4'-dimethylamino-2'-methoxy)-3-(1"-p-dimethylaminophenyl-1"-p-chlorophenyl-1',3"-butadien-4"-yl)benzophthalide, 3-(4'-dimethylamino-2'-benzyloxy)-3-(1"-p-dimethylaminophenyl-1"-phenyl-1",3"-butadien-4"-yl)benzophthalide, 3-dimethylamino-6-dimethylamino-fluorene-9-spiro-3'-(6'-dimethylamino) phthalide, 3,3-bis(2-(p-dimethylaminophenyl)-2-p-methoxyphenyl)ethenyl)-4,5,6,7-tetrachlorophthalide, 3-bis{ 1,1-bis(4-pyrrolidinophenyl)ethylen-2-yl}-5,6-dichloro-4,7-dibromophthalide, bis(p-dimethylaminostyryl)-1-naphthalenesulfonylmethane, bis(p-dimethylaminostyryl)-1-p-tolylsulfonylmethane, and 6'-(diethylamino)-2'-(2-fluoroanilino)spiro[phthalide-3,9'-xanthene]. The above-listed examples may be used alone or in combination.

An amount of the electron-donating compound is not particularly limited and may be appropriately selected depending on the intended purpose. The amount of the electron-donating compound is preferably 5% by mass or greater but 40% by mass or less, and more preferably 10% by mass or greater but 30% by mass or less, relative to a total amount of the thermosensitive recording layer.

<<Styrene-Acryl Resin>>

The styrene-acryl resin may be appropriately synthesized for use, or may be selected from commercial products. As the synthesis method, for example, the styrene-acryl resin can be produced by performing emulsion polymerization, dispersion polymerization, suspension polymerization, pulverization or solution/bulk polymerization, followed by performing emulsification.

Examples of the commercial products of the styrene-acryl resin include: product names of PDX-7357, PDX-7616A, PDX-7732, PDX-7741, PDX-7787, PDX-7734, PDX-7777, PDX-7615, HPD-71, and HPD-196 (all available from BASF SE); product names of EK-15, and EK-61 (both available from SAIDEN CHEMICAL INDUSTRY CO., LTD.); and product names of A-2092, and XK-110 (both available from DSM Coating Resins Ltd.).

The styrene-acryl resin is preferably a resin emulsion. The resin emulsion means a state where resin particles are dispersed in an aqueous medium, where the resin particles may be in the state of a solid or a fluid. The aqueous medium means a medium including water or a hydrophilic solvent as a component.

Examples of the method for dispersing the resin particles in the aqueous medium include: a forced emulsification method using a dispersant, and a self-emulsification method using a resin having an anionic group. In case of the forced emulsification, a dispersant may be remained in an image formed with an ink, and therefore the remained dispersant may reduce the fastness of the image. Therefore, use of a self-emulsification method is preferable.

An amount of the styrene-acryl resin is not particularly limited and may be appropriately selected depending on the intended purpose. The amount of the styrene-acryl resin is preferably 1.0% by mass or greater but 50.0% by mass or less, more preferably 10.0% by mass or greater but 50.0% by mass or less, and even more preferably 20.0% by mass or greater but 40.0% by mass or less, relative to a total amount of the thermosensitive recording layer.

In addition to the styrene-acryl resin, other resins may be added according to the necessity. Examples of other resins that can be added include: polyvinyl alcohol resins; starch or derivatives of starch; cellulose derivatives such as hydroxymethyl cellulose, hydroxyethyl cellulose, carboxymethyl cellulose, methyl cellulose, and ethyl cellulose; water-soluble polymers such as sodium polyacrylate, polyvinyl pyrrolidone, acrylamide-acrylic acid ester copolymers, styrene-acryl copolymers, acrylamide-acrylic acid ester-methacrylic acid terpolymers, styrene-maleic anhydride copolymer alkali salts, isobutylene-maleic anhydride copolymer alkali salts, polyacrylamide, sodium alginate, gelatin, and casein; emulsions of, for example, polyvinyl acetate resins, polyurethane resins, polyacrylic acid, polyacrylic acid ester, vinyl chloride-vinyl acetate copolymers, polybutyl methacrylate, and ethylene-vinyl acetate copolymers; and latexes of, for example, styrene-butadiene copolymers and styrene-butadiene-acrylic copolymers. The above-listed examples may be used alone or in combination.

When the above-mentioned other resins are added, an amount of the above-mentioned other resins is preferably 100 parts by mass or less, more preferably 50 parts by mass or less relative to 100 parts by mass of the styrene-acryl resin considering hot water resistance.

<<Photothermal Conversion Material>>

The photothermal conversion material is a material that absorbs laser light to convert the absorbed light into heat. The photothermal conversion material is roughly classified into an inorganic material and an organic material.

Examples of the inorganic material include particles of carbon black, metal boride, and metal oxide of Ge, Bi, In, Te, Se, Cr, etc. Among the above-listed examples, the metal boride and the metal oxide are preferable because light absorption in a near infrared wavelength range is large and light absorption in a visible wavelength range is small. For example, the metal boride and the metal oxide are preferably at least one selected from the group consisting of hexaboride, a tungsten oxide compound, antimony tin oxide (ATO), indium tin oxide (ITO), and zinc antimonite.

Examples of the hexaboride include $LaB_6$, $CeB_6$, $PrB_6$, $NdB_6$, $GdB_6$, $TbB_6$, $DyB_6$, $HoB_6$, $YB_6$, $SmB_6$, $EuB_6$, $ErB_6$, $TmB_6$, $YbB_6$, $LuB_6$, $SrB_6$, $CaB_6$, and $(La,Ce)B_6$.

Examples of the tungsten oxide compound include particles of tungsten oxide represented by a general formula: WyOz (with the proviso that W is tungsten, O is oxygen, and $2.2 \leq z/y \leq 2.999$), and particles of complex tungsten oxide represented by a general formula: MxWyOz (with the proviso that M is at least one element selected from the group consisting of H, He, alkali metals, alkaline earth metals, rare earth element, Mg, Zr, Cr, Mn, Fc, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, $0.001 \leq x/ \leq 1$, and $2.2 \leq z/y \leq 3.0$) (see International Publication No. WO2005/037932 and Unexamined Japanese Patent Application Publication No. 2005-187323). Among the above-listed examples, tungsten oxide including cesium is particularly preferable because absorption in a near infrared wavelength range is large and absorption in a visible wavelength range is small. Among the antimony tin oxide (ATO), moreover, the indium tin oxide (ITO), and the zinc antimonate, ITO is preferable because absorption in a near infrared wavelength range is large and absorption in a visible wavelength range is small.

The above-listed materials may be formed into a layer by vacuum vapor deposition, or adhering a particulate material with a resin, etc.

Various dyes are appropriately used as the organic material depending on a wavelength of light to be absorbed. In the case where a semiconductor laser is used as a light source, a near infrared absorbing dye having an absorption peak at from about 600 nm through about 1,200 nm is used. Specific examples of the near infrared absorbing dye include a cyanine dye, a quinone-based dye, a quinolone derivative of indonaphthol, a phenylenediamine-based nickel complex, and a phthalocyanine-based dye.

The above-listed photothermal conversion materials may be used alone or in combination.

The photothermal conversion material may be included in the thermosensitive recording layer or another layer that is not the thermosensitive recording layer. In the case where the photothermal conversion material is included in a layer that is not the thermosensitive recording layer, the layer including the photothermal conversion material is preferably disposed next to the thermosensitive recording layer.

An amount of the photothermal conversion material is preferably 0.1% by mass or greater but 10% by mass or less, and more preferably 0.3% by mass or greater but 5% by mass or less, relative to the thermosensitive recording layer.

<<Other Components>>

Examples of the above-mentioned other components include auxiliary additives, thermofusible materials, lubricants, filler, ultraviolet absorber, antioxidants, sensitizers, photo stabilizers, and a crosslinking agent.

As the auxiliary additive, for example, various hindered phenol compounds or hindered amine compounds that have electron-accepting property but have relatively low coloring capability may be added.

Examples of the auxiliary additive include 2,2'-methylenebis(4-ethyl-6-tertiary butylphenol), 4,4'-butylidene bis (6-tertiary butyl-2-methylphenol), 1,1,3-tris(2-methyl-4-hydroxy-5-tertiary butylphenyl)butane, 1,1,3-tris(2-methyl-4-hydroxy-5-cyclohexylphenyl)butane, 4,4'-thiobis(6-tertiary butyl-2-methylphenol), tetrabromo bisphenol A, tetrabromo bisphenol S, 4,4-thiobis(2-methylphenol), 4,4'-thiobis(2-chlorophenol), tetrakis(1,2,2,6,6-pentamethyl-4-piperidyl)-1,2,3,4-butane tetracarboxylate, and tetrakis(1,2,2,6,6-tetramethyl-4-piperidyl)-1,2,3,4-butane tetracarboxylate. The above-listed examples may be used alone or in combination.

Thermofusible Material

Examples of the thermofusible material include fatty acids (e.g., stearic acid and behenic acid), fatty acid amides (e.g., stearic acid amide and palmitic acid amide), fatty acid metal salts (e.g., zinc stearate, aluminum stearate, calcium stearate, zinc palmitate, and zinc behenate), p-benzyl biphenyl, terphenyl, triphenylmethane, benzyl p-benzyloxybenzoate, β-benzyloxynaphthalene, phenyl β-naphthoate, phenyl 1-hydroxy-2-naphthoate, methyl 1-hydroxy-2-naphthoate, diphenyl carbonate, glycol carbonate, dibenzyl terephthalate, dimethyl terephthalate, 1,4-dimethoxynaphthalene, 1,4-diethoxynaphthalene, 1,4-dibenzyloxynaphthalene, 1,2-diphenoxyethane, 1,2-bis(3-methylphenoxy)ethane, 1,2-bis(4-methylphenoxy)ethane, 1,4-diphenoxy-2-butene, 1,2-bis(4-methoxyphenylthio)ethane, dibenzoylmethane, 1,4-diphenylthiobutane, 1,4-diphenylthio-2-butene, 1,3-bis(2-vinyloxyethoxy)benzene, 1,4-bis(2-vinyloxyethoxy)benzene, p-(2-vinyloxyethoxy)biphenyl, p-aryloxybiphenyl, p-propargyloxybiphenyl, dibenzoyloxymethane, dibenzoyloxypropane, dibenzyl disulfide, 1,1-diphenyl ethanol, 1,1-diphenylpropanol, p-benzyloxy benzylalcohol, 1,3-phenoxy-2-propanol, N-octadecylcarbamoyl-p-methoxycarbonyl benzene, N-octadecylcarbamoyl benzene, 1,2-bis(4-methoxyphenoxy)propane, 1,5-bis(4-methoxyphenoxy)-3-oxapentane, dibenzyl oxalate, bis(4-methylbenzyl) oxalate, and bis(4-chlorobenzyl) oxalate. The above-listed examples may be used alone or in combination.

Lubricant

Examples of the lubricant include higher fatty acids or metal salts of higher fatty acids, higher fatty acid amides, higher fatty acid esters, animal wax, vegetable wax, mineral wax, petroleum wax, and synthetic wax. The above-listed examples may be used alone or in combination.

Filler

Examples of the filler include: inorganic powder such as calcium carbonate, silica, silica, zinc oxide, titanium oxide, zirconium oxide, aluminum hydroxide, zinc hydroxide, barium sulfate, clay, kaolin, talc, surface-treated calcium, and surface-treated silica; and organic powder such as urea-formalin resins, styrene-methacrylic acid copolymers, polystyrene resins, and vinylidene chloride resins. The above-listed examples may be used alone or in combination.

An amount of the filler is not particularly limited and may be appropriately selected depending on the intended purpose. The amount of the filler is preferably 0.4 parts by mass or less, and more preferably 0.2 parts by mass or less, relative to 1 part by mass of the binder resin.

Crosslinking Agent

The crosslinking agent is not particularly limited and may be appropriately selected depending on the intended purpose. Examples of the crosslinking agent include a glyoxal derivative, a methylol derivative, epichlorohydrin, polyamide epichlorohydrin, an epoxy resin, aziridine compound, hydrazine, a hydrazide derivative, an oxazoline derivative, and a carbodimide derivative. The above-listed examples may be used alone or in combination.

Ultraviolet Absorber

The ultraviolet absorber is not particularly limited and may be appropriately selected depending on the intended purpose. Examples of the ultraviolet absorber include a salicylic acid-based ultraviolet absorber, a benzophenone-based ultraviolet absorber, and a benzotriazole-based ultraviolet absorber.

Examples of the ultraviolet absorber include phenyl salicylate, p-tert-butylphenyl salicylate, p-octylphenyl salicylate, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, bis(2-methoxy-4-hydroxy-5-benzoylphenyl)methane, 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3',5'-di-tert-butylphenyl)chlorobenzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-{2'-hydroxy-3'-(3",4",5",6"-tetrahydrophthalimidemethyl)-5'-methylphenyl}benzotriazole, 2,2'-methylenebis{ 4-(1,1,3,3-tetramethylbutyl)-6-(2H-benzotriazol-2-yl)phenol}, 2-(2'-hydroxy-5'-methacryloxyphenyl)-2H-benzotriazole, 2-(3,5-di-t-amyl-2-hydroxyphenyl)benzotriazole, 2-(2'-hydroxy-5'-t-octylphenyl)benzotriazole, and 2-(5-methyl-2-hydroxyphenyl)benzotriazole. The above-listed examples may be used alone or in combination.

<Support>

A shape, structure, size, material, etc. of the support are not particularly limited and may be appropriately selected depending on the intended purpose. Examples of the shape of the support include a flat plate, and a sheet. The structure of the support may be a single-layer structure, or a multiple-layer structure. The size of the support may be appropriately selected depending on the size etc. of the thermosensitive recording medium.

As the support, for example, as well as typical paper, synthesis paper, or a plastic film, such as polyethylene, transparent polyethylene terephthalate, polypropylene, and vinyl chloride, may be used. When a plastic film is used as the support, a surface treatment, such as a matte finish treatment, and a corona treatment, may be performed on the support to improve fixability of a coating liquid. Among the above-listed examples, a polyethylene terephthalate sheet formed by biaxial stretching is preferable because of excellent strength, heat resistance, and size stability thereof. Moreover, a white opaque film formed by adding a white raw material or filler to the film, or a foam sheet formed by foaming may be used. Furthermore, a laminate of the above-listed materials may be also used. Typical examples thereof include a laminate of cellulose fiber filaments and synthesis paper, a laminate of cellulose fiber filaments and a plastic film, and a laminate of a plastic film and synthesis paper.

The support is preferably a transparent film for use in the field of the POS system for fresh food, packed meals, and pre-made meals, because the contents can visually recognized. In the present disclosure, the transparency is not particularly limited as long as a haze degree (turbidity) that is an index for indicating transparency of a film is about 10% or less. In order to achieve the object of the present disclosure, the haze degree of the support is more preferably 5% or less.

The average thickness of the support may be appropriately adjusted depending on the necessity. Considering transparency or processability, the average thickness of the support is preferably 3 micrometers or greater but 500 micrometers or less, and more preferably 10 micrometers or greater but 100 micrometers or less. When the average thickness of the support is less than 3 micrometers, the strength of the support may be insufficient. When the average thickness of the support is greater than 500 micrometers, transparency of the support may reduce, and processability reduces because rigidity of the support is too high.

<Protective Layer>

The protective layer includes a binder resin and a crosslinking agent. The protective layer may further include other components according to the necessity. The protective layer is preferably disposed on or above the thermosensitive layer.

The binder resin is not particularly limited and may be appropriately selected depending on the intended purpose. Examples of the binder resin include: acryl resins; polyvinyl alcohol resins; starch or derivatives of starch; cellulose derivatives such as hydroxymethyl cellulose, hydroxyethyl cellulose, carboxymethyl cellulose, methyl cellulose, and ethyl cellulose; water-soluble polymers such as sodium polyacrylate, polyvinyl pyrrolidone, acrylamide-acrylic acid ester copolymers, styrene-acryl copolymers, acrylamide-acrylic acid ester-methacrylic acid terpolymers, styrene-maleic anhydride copolymer alkali salts, isobutylene-maleic anhydride copolymer alkali salts, polyacrylamide, sodium alginate, gelatin, and casein; emulsions of, for example, polyvinyl acetate, polyurethane, polyacrylic acid, polyacrylic acid ester, vinyl chloride-vinyl acetate copolymers, polybutyl methacrylate, and ethylene-vinyl acetate copolymers; and latexes (aqueous emulsions) of, for example, styrene-butadiene copolymers and styrene-butadiene-acrylic copolymers. The above-listed examples may be used alone or in combination.

The crosslinking agent is not particularly limited and may be appropriately selected depending on the intended purpose. Examples of the crosslinking agent include glyoxal derivatives, methylol derivatives, epichlorohydrin, polyamide epichlorohydrin, epoxy compounds, aziridine compounds, hydrazine, hydrazide derivatives, oxazoline derivatives, and carbodiimide derivatives. The above-listed examples may be used alone or in combination.

Moreover, the protective layer preferably includes a pigment (filler) according to the necessity. Examples of the pigment used in the protective layer include: inorganic pigments, such as zinc oxide, calcium carbonate, barium sulfate, titanium oxide, lithopone, talc, agalmatolite, kaolin, aluminium hydroxide, and calcined kaolin; and organic pigments, such as crosslinked polystyrene resins, urea resins, silicone resins, crosslinked polymethyl methacrylate resins, and melamine-formaldehyde resins. In addition to the above-listed resin, water resistant additive, and pigment, the protective layer may include auxiliary additive components known in the art in combination, such as a surfactant, thermofusible material, a lubricant, a pressure-coloring inhibitor.

The protective layer is not particularly limited, and may be formed by any of typical methods known in the art.

The average thickness of the protective layer is not particularly limited and may be appropriately selected depending on the intended purpose. The average thickness is preferably 0.5 micrometers or greater but 5 micrometers or less, and more preferably 1 micrometers or greater but 3 micrometers or less.

<Printed Layer>

The printed layer is formed by printing an ink etc. The printed layer is formed in any of various colors, is formed of any of various materials, and is formed with any thickness. The printed layer constitute a background of the image printed on the thermosensitive recording layer. A product name, a name of a manufacturer, ingredient labeling etc. can be marked before packaging a product by disposing the printed layer. Moreover, the printed layer can provide excellent design to a product.

The printed layer is preferably disposed on the thermosensitive recording layer, or between the support and the thermosensitive recording layer, or on an opposite surface of the support to the surface thereof at which the thermosensitive recording layer is disposed.

The printed layer includes a colorant, a binder resin, and a solvent, and may further include other components according to the necessity.

The colorant is not particularly limited and may be appropriately selected depending on the intended purpose. As the colorant, a pigment or a dye may be used.

As the binder resin and other components, those used in the thermosensitive recording layer may be used.

The printed layer may be formed by gravure printing, flexographic printing, offset printing, UV printing, or inkjet printing.

The average thickness of the printed layer is not particularly limited and may be appropriately selected depending on the intended purpose. The average thickness of the printed layer is preferably 0.05 micrometers or greater but 4 micrometers or less, and more preferably 0.1 micrometers or greater but 2 micrometers or less.

<Other Layers>

The above-mentioned other layers are not particularly limited and may be appropriately selected depending on the intended purpose. Examples thereof include a back layer, an under layer, and a heat seal layer.

Back Layer

The back layer may be optionally disposed on an opposite surface of the support to a surface thereof at which the thermosensitive recording layer is disposed.

The back layer includes filler, and a binder resin, and may further include other components, such as a lubricant and a color pigment, according to the necessity.

As the filler, for example, inorganic filler or organic filler may be used.

Examples of the inorganic filler include carbonates, silicates, metal oxides, and sulfuric acid compounds.

Examples of the organic filler include silicone resins, cellulose, epoxy resins, nylon resins, phenol resins, polyurethane resins, urea resins, melamine resins, polyester resins, polycarbonate resins, styrene resins, acryl resins, polyethylene resins, formaldehyde resins, and polymethyl methacrylate resins.

The binder resin is not particularly limited and may be appropriately selected depending on the intended purpose. For example, the binder resin usable in the thermosensitive recording layer can be used as the binder resin of the back layer.

The average thickness of the back layer is not particularly limited and may be appropriately selected depending on the intended purpose. The average thickness of the back layer is preferably 0.1 micrometers or greater but 20 micrometers or less, and more preferably 0.3 micrometers or greater but 10 micrometers or less.

Under Layer

The under layer is not particularly limited and may be appropriately selected depending on the intended purpose. The under layer includes a binder resin and hollow thermoplastic resin particles. The under layer preferably further includes other components according to the necessity.

The hollow thermoplastic resin particles are micro hollow particles in the state of a foam. Each hollow thermoplastic resin particle includes a shell of a thermoplastic resin, and air or another gas inside the shell.

The average particle diameter (particle outer diameter) of the hollow thermoplastic resin particles is not particularly limited and may be appropriately selected depending on the intended purpose. The average particle diameter of the hollow thermoplastic resin particles is preferably 0.2 micrometers or greater but 20 micrometers or less, and more preferably 2 micrometers or greater but 5 micrometers or less.

When the average particle diameter is less than 0.2 micrometers, it is technically difficult to make the particles hollow, and therefore a function as the undercoat layer cannot be exhibited sufficiently. When the average particle diameter is greater than 20 micrometers, smoothness of the surface of the under layer after coating and drying reduces, which leads an uneven coating of a thermosensitive recording layer, and therefore more than a required amount of the thermosensitive recording layer forming liquid is applied to make the coating even.

The void ratio of the hollow thermoplastic resin particles is not particularly limited and may be appropriately selected depending on the intended purpose. The void ratio of the hollow thermoplastic resin particles is preferably from 50% through 95%, and more preferably from 80% through 95%.

When the void ratio is less than 30%, thermal insulation of the under layer is insufficient, and therefore thermal energy applied from a thermal head is released outside of the thermosensitive recording medium via the support, leading to an insufficient effect of improving sensitivity. The void ratio is a ratio between an outer diameter and inner diameter (diameter of a void) of a hollow particle, and is represented by the following formula.

$$\text{Void ratio (\%)}=(\text{inner diameter of hollow particle}/\text{outer diameter of hollow particle})\times 100$$

As described above, each of the hollow thermoplastic resin particles includes a shell of a thermoplastic resin. The thermoplastic resin is not particularly limited and may be appropriately selected depending on the intended purpose. Examples of the thermoplastic resin include styrene-acryl resins, polystyrene resins, acryl resins, polyethylene resins, polypropylene resins, polyacetal resins, chlorinated polyether resins, polyvinyl chloride resins, and a copolymer resin including vinylidene chloride and acrylonitrile as main components. Among the above-listed examples, a styrene-acryl resin, and a copolymer resin including vinylidene chloride and acrylonitrile as main components are preferable because a void ratio can be made high, variation in particle diameters can be minimized, and blade coating can be suitably applied at the time of coating.

An applied amount of the hollow plastic particles is not particularly limited and may be appropriately selected depending on the intended purpose. In order to maintain sensitivity and uniformity of coating, the amount thereof is ideally from 1 g through 3 g relative to 1 $m^2$ of the support. When the amount thereof is less than 1 $g/m^2$, sufficient sensitivity cannot be obtained. When the amount thereof is greater than 3 $g/m^2$, cohesion of the under layer decreases.

Heat Seal Layer

The heat seal layer is formed by laminating films of low density polyethylene (LDPE) used as a sealant. Therefore, the heat seal layer can be fused by heating in the state where the heat seal films are closely in contact with one another. Using the above-mentioned characteristics, a packaging sheet formed onto a bag is heated in the above-described state to seal, i.e., heat seal. Accordingly, a material for forming the heat seal layer is not limited to LDPE as long as the material is a material that is heat scalable, i.e., a heat seal material.

As the heat seal material, for example, films of high density polyethylene (HDPE), cast polypropylene (CPP), oriented polypropylene (OPP), and ethylene-vinyl acetate copolymer (EVA) etc., are suitably used. Moreover, a polyolefin resin (e.g., polyethylene, and polypropylene), a vinyl acetate-based resin (e.g., an olefin-vinyl acetate copolymer, such as an ethylene-vinyl acetate copolymer), or an acrylic resin (e.g., an olefin-(meth)acrylic acid copolymer, such as an ethylene-(meth)acrylic acid copolymer and iomer, and metal crosslinked products thereof) may be used. Furthermore, any of known heat seal adhesives may be used. In order to make a packaged product visible, a member that becomes transparent after forming is preferably used. The average thickness of the heat seal layer is preferably 5 micrometers or greater but 50 micrometers or less, and more preferably 10 micrometers or greater but 30 micrometers or less, considering transparency and sealing strength.

(Thermosensitive Recording Layer Forming Liquid)

The thermosensitive recording layer forming liquid of the present disclosure include a compound represented by any of General Formulae (1) to (3), a styrene-acryl resin, and a solvent. The thermosensitive recording layer forming liquid preferably further includes a leuco dye, and may further include other components according to the necessity.

As the leuco dye, the compound represented by any of General Formula (1) to (3), the styrene-acryl resin, and other component, the above-listed materials as being usable in the thermosensitive recording layer may be used.

Examples of the solvent include water, aromatic solvents, ester solvents, ketone solvents, alcohol solvents, aliphatic hydrocarbon, glycol solvents, and a petroleum solvent including paraffin or naphthene as a main component, and including 1% or less of an aromatic component. The above-listed examples may be used alone or in combination.

Examples of the aromatic solvent include benzene, toluene, and xylene.

Examples of the ester solvent include methyl acetate, ethyl acetate, and isopropyl acetate.

Examples of the ketone solvent include acetone, and methyl ethyl ketone.

Examples of the alcohol solvent include methanol, ethanol, isopropyl alcohol, and n-propyl alcohol.

Examples of the aliphatic hydrocarbon include n-hexane, n-heptane, and cyclohexane.

Examples of the glycol solvent include ethylene glycol, and diethylene glycol.

The thermosensitive recording layer forming liquid of the present disclosure can be prepared by pulverizing and dispersing a leuco dye, a compound represented by any of General Formula (1) to (3), a styrene-acryl resin, and other components together by means of a disperser, such as a ball mill, an attritor, and a sand mill until particle diameters of the dispersed particles are to be 0.1 micrometers or greater but 3 micrometers or less, optionally followed by blending with other components.

(Method for Producing Thermosensitive Recording Medium)

A method for producing a thermosensitive recording medium of the present disclosure includes a thermosensitive recording layer forming step. The thermosensitive recording layer forming step includes applying the thermosensitive recording layer forming liquid of the present disclosure onto a support to form a thermosensitive recording layer. The method may further include other steps according to the necessity.

The application method is not particularly limited and may be appropriately selected depending on the intended purpose. Examples of the application method include blade coating, gravure coating, gravure offset coating, bar coating, roll coating, knife coating, air knife coating, comma coating, U-comma coating, AKKU coating, smoothing coating, microgravure coating, reverse roll coating, 4 or 5-roll coating, dip coating, curtain coating, slide coating, and die coating.

A deposition amount of the thermosensitive recording layer forming liquid after being dried is not particularly limited and may be appropriately selected depending on the intended purpose. The deposition amount thereof is preferably 1 $g/m^2$ or greater but 20 $g/m^2$ or less, and more preferably 2 $g/m^2$ or greater but 10 $g/m^2$ or less on dry basis.

An embodiment of the thermosensitive recording medium of the present disclosure is not particularly limited, and may be appropriately selected depending on the intended purpose. For example, the thermosensitive recording medium may be used as a label as it is, or a layer to which letters, marks, images, barcodes, or QR codes (registered trademark) is printed may be disposed on or above the protective layer or the support. Moreover, an adhesive layer may be disposed at the opposite side of the support to the side of the support where the thermosensitive recording layer is disposed.

Moreover, a shape of the thermosensitive recording medium of the present disclosure is not particularly limited and may be appropriately selected depending on the intended purpose. Examples thereof include labels, sheets, and rolls.

<Use>

The thermosensitive recording medium of the present disclosure can be used in various fields. The thermosensitive recording medium is used as a packaging film for various containers, such as PET bottles of soft drinks, metal cans of coffee, and bottles of energy drinks and medical products, and bottles of beer, or packaging labels in the field of the POS system for fresh food, packed meals, and pre-made meals.

Embodiments of the thermosensitive recording medium of the present disclosure will be described with reference to drawings. In the figures, the same numerical reference is given to the same constitutional component, and duplicated description may be omitted. Moreover, the number of the constitutional components to be disposed, the position where the constitutional component is disposed, and the shape of the constitutional component are not limited to the following embodiments, and any number, position, shape, etc. suitable for carrying out the present disclosure may be selected.

First Embodiment

FIG. 1 is a schematic cross-sectional view illustrating an example of the thermosensitive recording medium according to the first embodiment. The thermosensitive recording medium of the first embodiment includes a support 1, and a thermosensitive recording layer 2 disposed on the support 1.

Second Embodiment

FIG. 2 is a schematic cross-sectional view illustrating an example of the thermosensitive recording medium according to the second embodiment. The thermosensitive recording medium of the second embodiment includes a support 1, and a thermosensitive recording layer 2 and a protective layer 3 disposed on the support 1 in this order.

Third Embodiment

FIG. 3 is a schematic cross-sectional view illustrating an example of the thermosensitive recording medium according to the third embodiment. The thermosensitive recording medium of the third embodiment includes a support 1, and a printed layer 4 and a thermosensitive recording layer 2 disposed on the support 1 in this order.

Fourth Embodiment

FIG. 4 is a schematic cross-sectional view illustrating an example of the thermosensitive recording medium according to the fourth embodiment. The thermosensitive recording medium of the fourth embodiment includes a support 1, and a printed layer 4, a thermosensitive recording layer 2, and a protective layer 3 disposed on the support 1 in this order.

Fifth Embodiment

FIG. 5 is a schematic cross-sectional view illustrating an example of the thermosensitive recording medium according to the fifth embodiment. The thermosensitive recording medium of the fifth embodiment includes a support 1, a thermosensitive recording layer 2 disposed on the support 1, and a printed layer 4 disposed on the surface of the support 1 at which the thermosensitive recording layer is not disposed.

Sixth Embodiment

FIG. 6 is a schematic cross-sectional view illustrating an example of the thermosensitive recording medium according to the sixth embodiment. The thermosensitive recording medium of the sixth embodiment includes, a support 1, a thermosensitive recording layer 2 and a protective layer 3 disposed on the support 1 in this order, and a printed layer 4 disposed on the surface of the support 1 at which the thermosensitive recording layer is not disposed.

Seventh Embodiment

FIG. 7 is a schematic cross-sectional view illustrating an example of the thermosensitive recording medium according to the seventh embodiment. The thermosensitive recording medium of the seventh embodiment includes a support 1, and a thermosensitive recording layer 2 and a printed layer 4 disposed on the support 1 in this order.

Eighth Embodiment

FIG. 8 is a schematic cross-sectional view illustrating an example of the thermosensitive recording medium according to the eighth embodiment. The thermosensitive recording medium of the eighth embodiment includes a support 1, and a thermosensitive recording layer 2, a protective layer 3, and a printed layer 4 disposed on the support 1 in this order.

(Image Recording Method)

The image recording method of the present disclosure includes heating the thermosensitive recording medium of the present disclosure with a thermal heat to record an image.

A shape, structure, size, etc. of the thermal head are not particularly limited and may be appropriately selected depending on the intended purpose.

In this case, a protective layer is preferably disposed on the thermosensitive recording layer considering preservability of the thermosensitive recording layer, and conformity with a thermal head. A protective layer is not necessarily disposed if a color developer having high image and background preservability is used, and conformity with a thermal head can be imparted directly to the thermosensitive recording layer by filler, a lubricant, etc.

When filler is added to the protective layer or thermosensitive recording layer to achieve conformity with a thermal head, the thermal head cannot be brought into close contact with the protective layer or thermosensitive recording layer, which is the original intention, if the 50% cumulative volume particle diameter ($D_{50}$) of the filler as measured by a laser diffraction/scattering particle size analyzer (device name: LA-960, available from Horiba, Ltd.) is too small. When the particle diameter of the filler is too large, the thermal head tends to be abraded and transparency cannot be secured easily. Therefore, the particle diameter of the filler is preferably, but is not limited to, in the approximate range of from 0.25 micrometers through 0.75 micrometers.

The image recording method of the present disclosure includes irradiating the thermosensitive recording medium of the present disclosure with laser light to record an image.

Various units may be used as a heating unit using laser light, but use of a laser light that can heat the thermosensitive recording medium without contact is preferable.

The laser light is not particularly limited and may be appropriately selected depending on the intended purpose. For example, various laser devices generally known in the art, such as a gas laser using gas (e.g. $CO_2$), a solid laser using a solid (e.g., YAG and $YVO_4$), and a semiconductor laser using a Group III-V semiconductor or Group IV-VI semiconductor, may be used. The laser device for use may be appropriately selected depending on the intended use and method.

Among the above-listed examples, the $CO_2$ laser emits light having a wavelength of 10,000 nm, which can be absorbed by general materials, and is actively utilized in a method that can perform thermosensitive recording without any particular absorbing materials.

When a photothermal conversion material, which is a material absorbing laser light having a wavelength of from 800 nm through 1,100 nm emitted from a semiconductor laser, YAF solid layer, or fiber layer to convert into heat, is added, moreover, as well as directly applying laser light to the thermosensitive recording layer, laser light can be also applied from the side of a transparent film, as the transparent plastic film, such as PET, and OPP does not absorb the laser light having a wavelength of from 800 nm through 1,100 nm. Therefore, the laser light can be applied from the side of the transparent film to record the thermosensitive recording layer disposed to the opposite side of the film, which leads to versatility of the thermosensitive recording medium in terms of use.

The output of laser light emitted from the image forming device in the image forming step is not particularly limited and may be appropriately selected depending on the intended purpose. The output thereof is preferably 1 W or greater, more preferably 3 W or greater, and particularly preferably 5 W or greater. When the output is less than 1 W, it may take a long time to form an image, and output becomes insufficient if the image formation time is shortened.

Moreover, the upper limit of the output of the laser light is not particularly limited and may be appropriately selected depending on the intended purpose. The upper limit thereof is preferably 200 W or less, more preferably 150 W or less, and particularly preferably 100 W or less. When the upper limit thereof is greater than 200 W, a size of a laser device used may be large.

In the case where image recording is performed on a thermosensitive recording medium at high speed, moreover, an image forming device including a laser array, in which laser light emitting elements are aligned into an array, is preferably used.

Next, as an example, a laser recording device that records an image on a long thermosensitive recording medium will be described.

FIG. 9 is a schematic perspective view illustrating an image recording system 100 that is a laser recording device.

In the description below, a conveying direction (traveling direction) of the thermosensitive recording medium is described as an X axial direction, the up-down direction is described as a Z axial direction, and the direction orthogonal to both the traveling direction and the up-down direction is described as a Y axial direction.

As described below, the image recording system 100 irradiates the thermosensitive recording medium 101 that is a recording target with laser light to perform a surface processing treatment, or an image recording process.

As illustrated in FIG. 9, the image recording system 100 includes a conveyance device 10, a recording device 20, a main body 30, an optical fiber 42, and an encoder 60.

The recording device 20 is configured to irradiate the recording target with laser light to perform a processing treatment on a surface of the recording target, or record an image that is a visible image on the recording target. The recording device 20 corresponds to a laser irradiation device. The recording device 20 is disposed at the side that is −Y axial direction relative to the conveyance device 10, specifically the −Y direction along the conveying path.

For example, the conveyance device 10 is configured to transport the thermosensitive recording medium 101 that is the recording target using a plurality of rotating rollers.

The main body 30 is connected with the conveyance device 10, and the recording device 20, and is configured to control the entire image recording system 100.

The encoder 60 is configured to acquire the traveling speed of the thermosensitive recording medium 101.

FIG. 10 is a schematic perspective view illustrating a structure of the image recording system 100.

The image recording system 100 includes a laser processing device 30 that is a laser light source. The laser processing device 30 includes a laser irradiation device 14 and an optical unit 43. The laser irradiation device 14 includes a laser array unit 14*a* and a fiber array unit 14*b*. As the laser irradiation device 14, a fiber array recording device is used. The fiber array recording device is configured to perform a surface processing treatment or image recording using a fiber array where a plurality of optical fiber laser emitters are aligned into an array along the main scanning direction (Z axial direction) orthogonal to the sub-scanning direction (X axial direction) that is the traveling direction of the thermosensitive recording medium 101 serving as the recording target.

The laser processing device 30 is configured to apply laser light emitted from the laser light emitting element 41 to the thermosensitive recording medium via the fiber array to record an image (visible image) formed of drawing units.

The laser array unit 14*a* includes a plurality of laser light emitting elements 41 aligned into an array, a cooling unit 50 configured to cool the laser light emitting elements 41, a plurality of driving drivers 45 disposed to correspond to the laser light emitting element 41 and configured to drive the corresponding the laser light emitting elements 41, and a controller 46 configured to control the driving drivers 45. The controller 46 is connected to a power source 48 configured to supply electricity to the laser light emitting elements 41, and an image information output unit 47, such as a personal computer for outputting image information.

In the laser light emitting element 41, typically, the energy that is not converted into laser light is converted into heat, thus the laser light emitting element 41 generates heat. Therefore, the laser light emitting element 41 is cooled by the cooling unit 50 that is a cooling device. Since the laser irradiation device 14 uses the fiber array unit 14*b*, moreover, the laser light emitting elements 41 can be disposed being separated from one another. As a result, the influence of heat from the adjacent laser light emitting element 41 can be minimized, and the laser light emitting elements 41 can be effectively cooled. Therefore, increase in the temperature of each laser light emitting element 41, and variation in the temperatures of the laser light emitting elements 41 can be avoided, variation in the output of laser light can be minimized, and density unevenness can be improved. The output of laser light is the average output measured by a power meter. As a method for controlling output of laser light, there are two methods, which are a method for controlling peak power, and a method for controlling a light emission ratio of a pulse (duty: laser light emitting time/cycle period). The cooling unit 50 employs a liquid cooling system where a coolant is circulated to cool the laser light emitting elements 41. The cooling unit 50 includes a heat-receiving unit 51 where the coolant receives the heat from each of the laser light emitting elements 41, and a heat-releasing unit 52 where the heat of the coolant is released. The heat-receiving unit 51 and the heat-releasing unit 52 are connected with each other via cooling pipes 53*a* and 53*b*. The heat-receiving unit 51 includes a case formed of a highly heat conductive member, and a cooling tube formed of a highly heat conductive member, where the cooling tube is disposed inside the case, and the coolant is circulated through the cooling tube. The laser light emitting elements 41 are aligned into an array on the heat-receiving unit 51.

The heat-releasing unit 52 includes a radiator, and a pump for circulating the coolant. The coolant sent out by the pump of the heat-releasing unit 52 is flown into the heat-receiving unit 51 via the cooling pipe 53*a*. As the coolant travels through the cooling tube inside the heat-receiving unit 51, the coolant takes out the heat of the laser light emitting elements 41 aligned on the heat-receiving unit 51 to cool the laser light emitting elements 41. The coolant the temperature of which has been increased by absorbing the heat of the laser light emitting elements 41 is flown out from the heat-receiving unit 41, and travels inside the cooling pipe 53*b* to flow into the radiator of the heat-releasing unit 52. The coolant is then cooled by the radiator. The coolant cooled by the radiator is again sent out to the heat-receiving unit 51 by the pump. The fiber array unit 14*b* includes optical fibers 42 disposed to correspond to the laser light emitting elements 41, and an array head 44 configured to hold the optical fibers 42 aligned into an array along the up-down direction (Z axial direction) at around the laser emitters 42*a* of the optical fibers 42. A laser receiver of each optical fiber 42 is disposed on the laser emitting surface of the corresponding laser light emitting element 41.

When all of the optical fibers 42 are held with one array head 44, the array head 44 becomes long, and is easily deformed. As a result, it is difficult to maintain the straight linear beam alignment and uniformity of beam pitch with only one array head 44. Therefore, each array head 44 holds from 100 through 200 optical fibers 42. The laser irradiation device 14 preferably includes a plurality of array heads 44, each of which holds from 100 through 200 optical fibers 42, where the array heads 44 are disposed and aligned along the Z axial direction that is the direction orthogonal to the traveling direction of the thermosensitive recording medium 101.

FIG. 11 is a view illustrating an alignment state of the laser array. As illustrated in FIG. 11, the optical fibers 42 of the array head 44 of FIG. 10 are aligned to continuously link dots of diameter R1 formed by emitting laser to color the thermosensitive recording medium at the focal point position created by converging by the optical unit 43.

As the scanning direction of laser light, there are a main-scanning direction and a sub-scanning direction, and the main-scanning direction and the sub-scanning direction are orthogonal to each other. The main-scanning direction is a direction along which a plurality of the optical fiber 42 are aligned. The sub-scanning direction is a direction along which the thermosensitive recording medium travels.

Since an image is recording on the thermosensitive recording medium by relatively moving the array head 44 and the thermosensitive recording medium, the array head 44 may be moved relative to the thermosensitive recording medium, or the thermosensitive recording medium may be moved relative to the array head 44. Even when the array head 44 is moved relative to the thermosensitive recording medium, the phrase "traveling speed of the thermosensitive recording medium" is used with using the array head 44 as an observation point.

As illustrated in FIG. 10, moreover, the optical unit 43, which is an example of an optical system, includes a collimator lens 43*a* configured to convert a diffusing flux of laser light emitted from the optical fibers 42 into a parallel luminous flux, and a condenser lens 43*b* configured to converge the laser light to illuminate a surface of the thermosensitive recording medium that is a laser irradiation surface. Whether the optical unit 43 is disposed or not may be appropriately decided depending on the intended purpose.

The image information output unit 47, such as a personal computer, is configured to input image information to the controller 46. The controller 46 is configured to generate a driving signal (control pulse) for driving each driver 45 based on the input image information. The controller 46 is configured to transmit the generated driving signal (control pulse) to each driving driver 45. Specifically, the controller 46 includes a clock generator. The controller 46 transmits a driving signal (control pulse) for each driver 45 to the driver 45 when the clock frequency oscillated by the clock generator reaches the predetermined clock frequency.

Once each driver 45 receives the driving signal (control pulse), the driver 45 transmits a current pulse to drive the corresponding laser light emitting element 41. As driven by the driver 45, the laser light emitting element 41 outputs a luminous pulse to emit laser light. The laser light emitted from the laser light emitting element 41 enters the corresponding optical fiber 42 to be emitted from the laser emitter 42*a* of the optical fiber 42. The laser light emitted from the laser emitter 42*a* of the optical fiber 42 is passed through the collimator lens 43*a* and the condenser lens 43*b* of the optical unit 43, followed by being applied to the thermosensitive recording medium, which is a recording target. The thermosensitive recording medium is heated by the applied laser light to record an image on the thermosensitive recording medium.

When a device configured to deflect laser light with a galvanometer mirror to record an image in a recording target is used, an image, such as a letter, is recorded by applying laser light to draw the image with one stroke by rotating the galvanometer mirror. In the case where a certain amount of information is recorded in a recording target, therefore, recording cannot catch up with the traveling speed of the recording target, unless the recording target is stopped being transported.

Meanwhile, the laser irradiation device 14 uses a laser array, in which a plurality of laser light emitting elements 41 are aligned into an array, and therefore an image can be recorded on the thermosensitive recording medium by controlling on and off of the laser light emitting element for each pixel. As a result, an image can be recorded on the thermosensitive recording medium without stopping the transportation of the thermosensitive recording medium even when an amount of information to be recorded is large. Accordingly, use of the laser irradiation device 14 can realize recording of an image without lowering productivity even when a large amount of information is recorded in a recording target.

The laser irradiation device 14 is configured to apply laser light to the thermosensitive recording medium to heat the thermosensitive recording medium to record an image on the thermosensitive recording medium. Therefore, the laser irradiation device 14 is desired to have laser light emitting elements 41 of relatively high output. For this reason, the laser light emitting elements 41 generate a large quantity of heat. In a conventional laser array recording device that does not have a fiber array unit 14*b*, it is desired to arrange the laser light emitting elements 41 into an array at the pitch corresponding to the resolution. In order to achieve the resolution of 200 dpi, therefore, the laser light emitting elements 41 are arranged at a very narrow pitch in a conventional laser array recording device. As a result, heat generated from the laser light emitting elements 41 is not easy to be released inside the conventional laser array recording device, and the laser light emitting elements 41 tend to be heated at a high temperature. As the temperature of the laser light emitting element 41 increases in the conventional laser array recording device, the wavelength of light emitted from the laser light emitting element 41 or luminous output of the laser light emitting element 41 fluctuates, and therefore the laser array recording device cannot heat a recording target to the predetermined temperature. As a result, an excellent image cannot be obtained. In order to suppress such increase in the temperature of the laser light emitting element 41 of the conventional laser array recording device, it is important to secure a sufficient gap between emissions of the laser light emitting elements 41 by reducing the transportation speed of the recording target, and therefore productivity cannot be enhanced sufficiently.

Typically, the cooling unit 50 often employs a chiller system. In the chiller system, only cooling is performed without performing heating. Therefore, the temperature of the light source does not exceed the set temperature of the chiller, but the temperature of the cooling unit 50 and the temperature of the laser light emitting element 41 to be in contact with the cooling unit 50 are fluctuated by the surrounding temperature. When a semiconductor laser is used as the laser light emitting element 41, meanwhile, laser output varies depending on the temperature of the laser light emitting element 41 (the laser output is high when temperature of the laser light emitting element 41 is a low temperature). In order to control laser output, therefore, a temperature of the laser light emitting element 41 or a temperature of the cooling unit 50 is preferably measured, and an input signal to the driver 45 for controlling the laser output is controlled based on the measured temperature to make the laser output constant to thereby perform regular image formation.

On the other hand, the laser irradiation device 14 is the fiber array recording device using the fiber array unit 14*b*. Since the fiber array recording device is used, the laser emitter 42*a* of the fiber array unit is arranged at the pitch corresponding to the resolution, and it is not necessary to arrange the laser light emitting elements of the laser array unit 14*a* at the pitch corresponding to the image resolution. Therefore, heat of the laser light emitting elements 41 of the laser irradiation device 14 is sufficiently released, and the pitch of the laser light emitting elements 41 can be made sufficiently wide. According to the laser irradiation device 14, the laser light emitting element 41 is prevented from being heated to a high temperature, and variations in the wavelength or output of the laser light emitting element 41 can be prevented. As a result, the laser irradiation device 14 can record an excellent image on the thermosensitive recording medium. Even when the emission pitch of the laser light emitting elements 41 is shorten, an increase in the temperature of the laser light emitting elements 41 can be prevented, and thus the traveling speed of the thermosensitive recording medium can be increased, thus increasing productivity.

Since the cooling unit 50 is disposed in the laser irradiation device 14 to cool the laser light emitting element 41 with a liquid, therefore, an increase in the temperature of the laser light emitting element 41 can be prevented further. As a result, the laser irradiation device 14 can further shorten emission gap of the laser light emitting elements 41, and the traveling speed of the thermosensitive recording medium can be increased, and the productivity can be enhanced. In the laser irradiation device 14, the laser light emitting elements 41 are cooled with a liquid, but the laser light emitting elements 41 may be cooled with air by a cooling fan etc. However, the liquid cooling has advantages that the liquid cooling has the higher cooling efficiency than the air cooling, and the laser light emitting element 41 can be cooled well. On the other hand, the air cooling has an advantage that the laser light emitting elements 41 can be cooled at low cost through the air cooling has the cooling efficiency inferior to the liquid cooling.

EXAMPLES

The present disclosure will be described more specifically below by way of Examples. The present disclosure should not be construed as being limited to these Examples.

The compounds numbered Compound Nos. 1 to 5 used in Examples below were synthesized in the same manner as in Synthesis Examples disclosed in Japanese Patent No. 6751479.

Example 1

<Production of Thermosensitive Recording Medium>

Preparation of Dye Dispersion Liquid

Thirty six parts by mass of 3-di-n-butylamino-6-methyl-7-anilinofluoran, 10 parts by mass of a carboxyl group-containing acryl resin aqueous solution (styrene-acryl resin, product name: HPD-196, solid content: 36% by mass, available from BASF SE), 3.6 parts by mass of a surfactant (product name: PD-001, solid content: 10% by mass, available from Nissin Chemical Co., Ltd.), and 50.4 parts by mass of ion-exchanged water were blended and dispersed by means of a sand mill until 50% cumulative volume particle diameter (D50) of the dispersed elements as measured by a laser diffraction/scattering particle size analyzer (device name: LA-960, available from Horiba, Ltd.) was to be 0.2 micrometers or less, to thereby obtain a dye dispersion liquid.

Preparation of Color Developer Dispersion Liquid

A compound of Compound No. 1 represented by the structural formula below (36 parts by mass), 10 parts by mass of a carboxyl group-containing acryl resin aqueous solution (styrene-acryl resin, product name: HPD-196, solid content: 36% by mass, available from BASF SE), 3.6 parts by mass of a surfactant (product name: PD-001, solid content: 10% by mass, available from Nissin Chemical Co., Ltd.), and 50.4 parts by mass of ion-exchanged water were blended and dispersed by means of a sand mill until 50% cumulative volume particle diameter (D50) of the dispersed elements as measured by a laser diffraction/scattering particle size analyzer (device name: LA-960, available from Horiba, Ltd.) was to be 0.2 micrometers, to thereby obtain a color developer dispersion liquid.

<Compound of Compound No. 1>

[Chem.10]

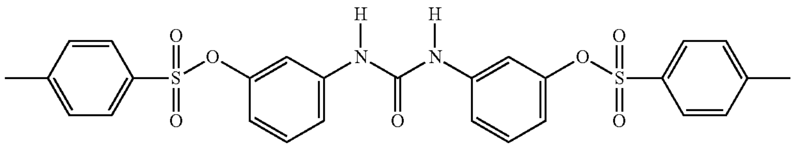

Preparation of Thermosensitive Recording Layer Forming Liquid

Next, 12.4 parts by mass of the obtained dye dispersion liquid, 37.3 parts by mass of the color developer dispersion liquid, 21.8 parts by mass of an acrylic emulsion (styrene-acryl resin, product name: EK-61, solid content: 41% by mass, available from SAIDEN CHEMICAL INDUSTRY CO., LTD.), and 28.5 parts by mass of ion-exchanged water were blended and stirred to thereby obtain a thermosensitive recording layer forming liquid.

Formation of Thermosensitive Recording Layer

Next, the thermosensitive recording layer forming liquid was applied onto one side of a polyethylene terephthalate film (product name: E5100, the average thickness: 50 micrometers, available from TOYOBO CO., LTD., haze degree: 4.5) by a bar coater so that a deposition amount thereof was to be 4.0 g/$m^2$ on dry basis, followed by drying, to thereby produce Thermosensitive Recording Medium 1.

The haze degree of the polyethylene terephthalate film was the value measured by a haze mater (device name: HZ-V3, available from Suga Test Instruments Co., Ltd.).

Example 2

A color developer dispersion liquid was prepared in the same manner as in Example 1, except that, in the preparation of the color developer dispersion liquid of Example 1, the compound of Compound No. 1 was replaced with a compound of Compound No. 2 represented by the following structural formula.

Next, Thermosensitive Recording Medium 2 was produced in the same manner as in Example 1, except that the above-prepared color developer dispersion liquid was used for forming a thermosensitive recording layer.

<Compound of Compound No. 2>

[Chem.11]

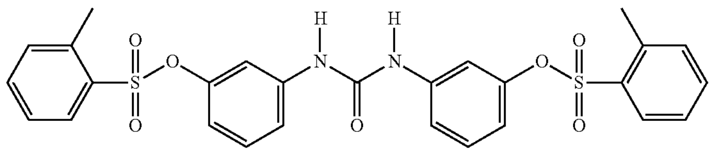

Example 3

A color developer dispersion liquid was prepared in the same manner as in Example 1, except that, in the preparation of the color developer dispersion liquid of Example 1, the compound of Compound No. 1 was replaced with a compound of Compound No. 3 represented by the following structural formula.

Next, Thermosensitive Recording Medium 3 was produced in the same manner as in Example 1, except that the above-prepared color developer dispersion liquid was used for forming a thermosensitive recording layer.

<Compound of Compound No. 3>

[Chem.12]

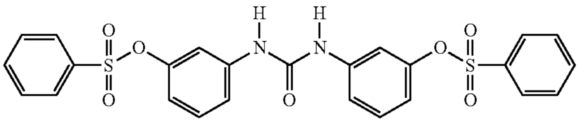

Example 4

A color developer dispersion liquid was prepared in the same manner as in Example 1, except that, in the preparation of the color developer dispersion liquid of Example 1, the compound of Compound No. 1 was replaced with a compound of Compound No. 4 represented by the following structural formula.

Next, Thermosensitive Recording Medium 4 was produced in the same manner as in Example 1, except that the above-prepared color developer dispersion liquid was used for forming a thermosensitive recording layer.

<Compound of Compound No. 4>

[Chem.13]

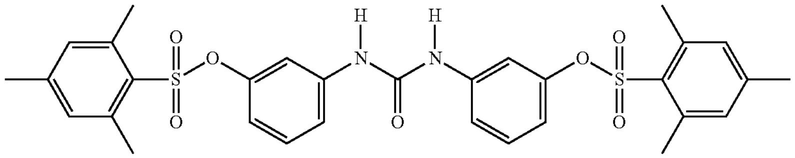

Example 5

A color developer dispersion liquid was prepared in the same manner as in Example 1, except that, in the preparation of the color developer dispersion liquid of Example 1, the compound of Compound No. 1 was replaced with a compound of Compound No. 5 represented by the following structural formula.

Next, Thermosensitive Recording Medium 5 was produced in the same manner as in Example 1, except that the above-prepared color developer dispersion liquid was used for forming a thermosensitive recording layer.

<Compound of Compound No. 5>

[Chem.14]

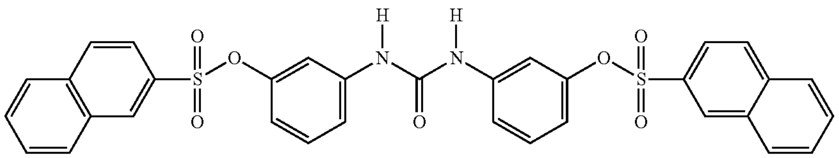

Example 6

Thermosensitive Recording Medium 6 was produced in the same manner as in Example 1, except that a protective layer was formed by applying the following protective layer coating liquid onto the thermosensitive recording layer by a bar coater so that a deposition amount thereof was to be 2.0 $g/m^2$ on dry basis.

<Preparation of Protective Layer Coating Liquid>

Calcium carbonate (40.7 parts by mass), 11.3 parts by mass of a carboxyl group-containing acryl resin aqueous solution (styrene-acryl resin, product name: HPD-196, solid content: 36% by mass, available from BASF SE), 2 parts by mass of a surfactant (product name: PD-001, solid content: 10% by mass, available from Nissin Chemical Co., Ltd.), and 46 parts by mass of ion-exchanged water were blended and dispersed by means of a sand mill until 50% cumulative volume particle diameter (D50) of the dispersed elements as measured by a laser diffraction/scattering particle size analyzer (device name: LA-960, available from Horiba, Ltd.) was to be 0.2 micrometers or less, to thereby obtain a dispersion liquid.

Next, 19.9 parts by mass of the obtained dispersion liquid, 21.9 parts by mass of an acrylic emulsion (styrene-acryl resin, product name: EK-61, solid content: 41% by mass, available from SAIDEN CHEMICAL INDUSTRY CO., LTD.), 9.2 parts by mass of an oxazoline group-containing polymer emulsion (product name: WS-500, solid content: 39% by mass, available from NIPPON SHOKUBAI CO., LTD.), 4.5 parts by mass of an oxidized polyethylene wax dispersion liquid (solid content: 30% by mass), and 44.5 parts by mass of ion-exchanged water were blended and stirred to thereby obtain a protective layer coating liquid.

Example 7

A dye dispersion liquid was prepared in the same manner as in Example 1, except that, in the preparation of dye dispersion liquid of Example 1, 3-di-n-butylamino-6-methyl-7-anilinofluoran was replaced with 6'-(diethylamino)-2'-(2-fluoroanilino)spiro[phthalide-3,9'-xanthene].

Next, Thermosensitive Recording Medium 7 was produced in the same manner as in Example 1, except that the above-prepared color developer dispersion liquid was used for forming a thermosensitive recording layer.

Example 8

Thermosensitive Recording Medium 8 was produced in the same manner as in Example 1, except that a thermosensitive recording layer was formed by using the following thermosensitive recording layer forming liquid.

<Thermosensitive recording layer forming liquid>

The dye dispersion liquid prepared in Example 1 (6.7 parts by mass), 20 parts by mass of the color developer dispersion liquid prepared in Example 1, 5.9 parts by mass of an acrylic emulsion (styrene-acryl resin, product name: EK-61, solid content: 41% by mass, available from SAIDEN CHEMICAL INDUSTRY CO., LTD.), 24.1 parts by mass of an itaconic acid-modified polyvinyl alcohol aqueous solution (product name: KURARAY POVAL 25-88KL, solid content: 10% by mass, available from KURARAY CO., LTD.), and 43.4 parts by mass of ion-exchanged water were blended and stirred to thereby prepare a thermosensitive recording layer forming liquid.

Example 9

Thermosensitive Recording Medium 9 was produced in the same manner as in Example 1, except that a thermosensitive recording layer was formed by using the following thermosensitive recording layer forming liquid.

<Thermosensitive Recording Layer Forming Liquid>

The dye dispersion liquid prepared in Example 1 (12 parts by mass), 36.2 parts by mass of the color developer dispersion liquid prepared in Example 1, 21.2 parts by mass of an acrylic emulsion (styrene-acryl resin, product name: EK-61, solid content: 41% by mass, available from SAIDEN CHEMICAL INDUSTRY CO., LTD.), 3 parts by mass of a cesium tungsten oxide dispersion (product name: YMW-D20, solid content: 28.5% by mass, available from Sumitomo Metal Mining Co., Ltd.) serving as a photothermal conversion material, and 27.6 parts by mass of ion-exchanged water were blended and stirred to thereby prepare a thermosensitive recording layer forming liquid.

Example 10

Thermosensitive Recording Medium 10 was produced in the same manner as in Example 1, except that a printing ink (product name: FINART R794 White G8, solid content: 42% by mass, available from DIC Graphics Corporation) was applied onto a surface of the support by a bar coater so that the deposition amount of the ink was to be 1.0 $g/m^2$ on dry basis, to thereby form a printed layer.

Comparative Example 1

A color developer dispersion liquid was prepared in the same manner as in Example 1, except that in the preparation of the color developer dispersion liquid of Example 1, the compound of Compound No. 1 was replaced with N-[2-[[(phenylamino)carbonyl]amino]phenyl]benzene sulfone amide (product name: NKK-1304, available from Nippon Soda Co., Ltd.).

Next, Thermosensitive Recording Medium 11 was produced in the same manner as in Example 1, except that the above-prepared color developer dispersion liquid was used for forming a thermosensitive recording layer.

Comparative Example 2

A color developer dispersion liquid was prepared in the same manner as in Example 1, except that in the preparation of the color developer dispersion liquid of Example 1, the compound of Compound No. 1 was replaced with 4-methyl-N-[[[3-[[(4-methylphenyl)sulfonyl]oxy]phenyl]amino]carboxyl]benzene sulfonamide (product name: P-201, available from BASF SE).

Next, Thermosensitive Recording Medium 12 was produced in the same manner as in Example 1, except that the above-prepared color developer dispersion liquid was used for forming a thermosensitive recording layer.

Comparative Example 3

A color developer dispersion liquid was prepared in the same manner as in Example 1, except that in the preparation of the color developer dispersion liquid of Example 1, the compound of Compound No. 1 was replaced with 4-hydroxy-4'-isopropoxydiphenylsulfone (product name: D-8, available from Nippon Soda Co., Ltd.).

Next, Thermosensitive Recording Medium 13 was produced in the same manner as in Example 1, except that the above-prepared color developer dispersion liquid was used for forming a thermosensitive recording layer.

Comparative Example 4

A color developer dispersion liquid was prepared in the same manner as in Example 1, except that in the preparation of the color developer dispersion liquid of Example 1, the compound of Compound No. 1 was replaced with bis(4-hydroxyphenyl)sulfone monoallyl ether (product name: BPS-MAE, available from NICCA CHEMICAL CO., LTD.).

Next, Thermosensitive Recording Medium 14 was produced in the same manner as in Example 1, except that the above-prepared color developer dispersion liquid was used for forming a thermosensitive recording layer.

Comparative Example 5

A dye dispersion liquid and a color developer dispersion liquid were prepared in the same manner as in Example 1, except that in the preparations of the dye dispersion liquid and the color developer dispersion liquid, 10 parts by mass of the carboxyl group-containing acryl resin aqueous solution (styrene-acryl resin, product name: HPD-196, solid content: 36% by mass, available from BASF SE) was replaced with 18 parts by mass of a polyvinyl alcohol aqueous solution (product name: GOSENX L-3266, solid content: 30% by mass, available from Nippon Synthetic Chemical Industry Co., Ltd.), and the amount of the ion-exchanged water was changed from 50.4 parts by mass to 42.3 parts by mass.

Next, 8.7 parts by mass of the obtained dye dispersion liquid, 25.9 parts by mass of the obtained color developer dispersion liquid, 31.2 parts by mass of an itaconic acid-modified polyvinyl alcohol aqueous solution (product name: KURARAY POVAL 25-88KL, solid content: 10% by mass, available from KURARAY CO., LTD.), 5 parts by mass of a polyamide epichlorohydrin resin aqueous solution (product name: WS-525, solid content: 25% by mass, available from SEIKO PMC CORPORATION), and 29.3 parts by mass of ion-exchanged water were blended and stirred to thereby prepare a thermosensitive recording layer forming liquid.

Next, Thermosensitive Recording Medium 15 was produced in the same manner as in Example 1, except that a thermosensitive recording layer was formed by using the above-prepared thermosensitive recording layer forming liquid.

Comparative Example 6

A dye dispersion liquid and a color developer dispersion liquid were prepared in the same manner as in Example 1, except that in the preparations of the dye dispersion liquid and the color developer dispersion liquid, 10 parts by mass of the carboxyl group-containing acryl resin aqueous solution (styrene-acryl resin, product name: HPD-196, solid content: 36% by mass, available from BASF SE) was replaced with 7.2 parts by mass of a polyurethane resin aqueous solution (product name: Gen 0851, solid content: 50% by mass, available from Borchers Inc.), and the amount of the ion-exchanged water was changed from 50.4 parts by mass to 53.2 parts by mass. Next, 14.7 parts by mass of the obtained dye dispersion liquid, 44.1 parts by mass of the obtained color developer dispersion liquid, 15.1 parts by mass of a polyurethane resin dispersion liquid (product name: WLS-201, solid content: 35% by mass, available from DIC Corporation), and 26 parts by mass of ion-exchanged water were blended and stirred to thereby prepare a thermosensitive recording layer forming liquid.

Next, Thermosensitive Recording Medium 16 was produced in the same manner as in Example 1, except that a thermosensitive recording layer was formed by using the above-prepared thermosensitive recording layer forming liquid.

Next, the produced thermosensitive recording media of Examples 1 to 10 and Comparative Examples 1 to 6 were subjected to evaluations of "hot water resistance (60° C.)," "hot water resistance (40° C.)," "water resistance," "ethanol resistance," "temperature and humidity resistance," "wet abrasion resistance," "heat resistance (110° C.)," "heat resistance (90° C.)," and "LD laser printability."

The results of "hot water resistance (60° C.)," "hot water resistance (40° C.)," "water resistance," "ethanol resistance," "temperature and humidity resistance," "wet abrasion resistance," "heat resistance (110° C.)," and "heat resistance (90° C.)" are presented in Tables 1 and 2.

<Hot Water Resistance (60° C.)>

Each thermosensitive recording medium was provided for printing under the following printing conditions using a $CO_2$ laser marker (device name: LP-435TU, available from Panasonic Industrial Devices SUNX Co., Ltd.) to thereby produce a pre-test image sample.

The produced pre-test image sample was immersed in tap water of 60° C., and the sample was stored for 96 hours with maintaining the water temperature to 60° C. using a constant temperature chamber. The image density of the sample before and after the storage for 96 hours was measured by means of a reflection densitometer (X-Rite eXact, available from X-Rite Inc.). An image survival rate was determined according to the following equation, and the result was evaluated based on the following criteria.

Image survival rate (%)=[(image density after test)/(image density before test)]×100

(Printing Conditions)

Work distance: 275 mm
Scanning speed: 900 mm/s
Laser light wavelength: 10.6 micrometers
Laser power: 10%

(Evaluation Criteria)

A: The image survival rate was 90% or greater.
B: The image survival rate was 80% or greater but 89% or less.
C: The image survival rate was 79% or less.

<Hot Water Resistance (40° C.)>

Each produced pre-test image sample was immersed in tap water of 40° ° C., and the sample was stored for 96 hours with maintaining the water temperature to 40° C. using a constant temperature chamber. The image density of the sample before and after the storage for 96 hours was measured by means of a reflection densitometer (X-Rite eXact, available from X-Rite Inc.). An image survival rate was determined according to the following equation, and the result was evaluated based on the following criteria.

Image survival rate (%)=[(image density after test)/(image density before test)]×100

(Evaluation Criteria)

A: The image survival rate was 90% or greater.
B: The image survival rate was 80% or greater but 89% or less.
C: The image survival rate was 79% or less.

<Water Resistance>

Each of the produced image samples was immersed in tap water of 23° C. for 96 hours. The image density of the sample before and after immersing in water for 96 hours was measured by means of a reflection densitometer (X-Rite exact, available from X-Rite Inc.). An image survival rate was determined according to the following equation, and the result was evaluated based on the following criteria.

Image survival rate (%)=[(image density after test)/(image density before test)]x100

(Evaluation Criteria)

A: The image survival rate was 90% or greater.

B: The image survival rate was 80% or greater but 89% or less.

C: The image survival rate was 79% or less.

<Ethanol Resistance>

Each of the produced image samples was immersed in an 80% by mass ethanol aqueous solution for 30 seconds. The image density of the sample before and after immersing in the aqueous solution for 30 seconds was measured by means of a reflection densitometer (X-Rite eXact, available from X-Rite Inc.). An image survival rate was determined according to the following equation, and the result was evaluated based on the following criteria.

Image survival rate (%)=[(image density after test)/(image density before test)]x100

(Evaluation Criteria)

A: The image survival rate was 90% or greater.

B: The image survival rate was 80% or greater but 89% or less.

p C: The image survival rate was 79% or less.

<Temperature and humidity resistance>

Each of the produced image samples was stored in the environment of 40° C. and 90% RH for 72 hours. The image density of the sample before and after the storage was measured by means of a reflection densitometer (X-Rite eXact, available from X-Rite Inc.). An image survival rate was determined according to the following equation, and the result was evaluated based on the following criteria.

Image survival rate (%)=[(image density after test)/(image density before test)]x100

(Evaluation Criteria)

A: The image survival rate was 90% or greater.

B: The image survival rate was 80% or greater but 89% or less.

C: The image survival rate was 79% or less.

<Wet abrasion resistance>

One drop of water was dripped on each of the produced image samples. After rubbing with a finger 100 times, the presence of pealing, dissolution, and blurring of each layer was visually observed, and the result was evaluated based on the following criteria.

(Evaluation Criteria)

I: There was no pealing, dissolution, and blurring.

II: There was pealing, dissolution, or blurring.

<Heat resistance>

Each of the produced image samples was stored in the environment of 110° C., and in the environment of 90° C. for 1 hour. After the storage, the density of the background of the sample was measured by means of a reflection densitometer (X-Rite eXact, available from X-Rite Inc.). The result was evaluated based on the following criteria.

(Evaluation Criteria)

I: The density of the background was 0.29 or less.

II: The density of the background was 0.30 or greater.

<LD Laser Printability>

Each of the thermosensitive recording media produced in Examples 1 to 10 and Comparative Examples 1 to 6 was provided for printing under the following printing conditions using a LD laser marker (device name: Ricoh Rewritable Laser Marker LDM200, available from Ricoh Company Limited) to thereby produce an image sample.

(Printing Conditions)

Work distance: 150 mm

Scanning speed: 3,000 mm/s

Laser light wavelength: 980 nm

Laser power: 70%

(Evaluation Criteria)

I: Printable

II: Not printable (Evaluation Results)

The thermosensitive recording medium of Example 9, in which the photothermal conversion material was included in the thermosensitive recording layer was printable (I), but the thermosensitive recording media of Examples 1 to 8, and 10 and Comparative Examples 1 to 6, in which the photothermal conversion material was not included in the thermosensitive recording layer was not printable (II).

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Hot water resistance (60° C.) | Image survival rate (%) | 85 | 82 | 84 | 83 | 84 | 96 | 80 | 81 | 83 | 82 |
| | Evaluation | B | B | B | B | B | A | B | B | B | B |
| Hot water resistance (40° C.) | Image survival rate (%) | 85 | 81 | 80 | 81 | 85 | 91 | 87 | 82 | 84 | 83 |
| | Evaluation | B | B | B | B | B | A | B | B | B | B |
| Water resistance | Image survival rate (%) | 97 | 93 | 91 | 96 | 95 | 100 | 100 | 97 | 96 | 95 |
| | Evaluation | A | A | A | A | A | A | A | A | A | A |
| Ethanol resistance | Image survival rate (%) | 85 | 80 | 81 | 82 | 80 | 84 | 89 | 80 | 84 | 82 |
| | Evaluation | B | B | B | B | B | B | B | B | B | B |
| Temperature and humidity resistance | Image survival rate (%) | 100 | 99 | 96 | 98 | 99 | 100 | 100 | 99 | 99 | 98 |
| | Evaluation | A | A | A | A | A | A | A | A | A | A |

TABLE 1-continued

| | | Example | | | | | | | | | |
|---|---|---|---|---|---|---|---|---|---|---|---|
| | | 1 | 2 | 3 | 4 | 5 | 6 | 7 | 8 | 9 | 10 |
| Wet abrasion resistance | Evaluation | I | I | I | I | I | I | I | I | I | I |
| Heat resistance (110° C.) | Background density | 0.27 | 0.28 | 0.26 | 0.24 | 0.27 | 0.92 | 0.16 | 0.20 | 0.28 | 0.99 |
| | Evaluation | I | I | I | I | I | I | I | I | I | I |
| Heat resistance (90° C.) | Background density | 0.16 | 0.15 | 0.17 | 0.18 | 0.16 | 0.14 | 0.13 | 0.12 | 0.14 | 0.18 |
| | Background density | I | I | I | I | I | I | I | I | I | I |

TABLE 2

| | | Comparative Example | | | | | |
|---|---|---|---|---|---|---|---|
| | | 1 | 2 | 3 | 4 | 5 | 6 |
| Hot water resistance (60° C.) | Image suvival rate (%) | 24 | 38 | 19 | 21 | 36 | 5 |
| | Evaluation | C | C | C | C | C | C |
| Hot water resistance (40° C.) | Image suvival rate (%) | 65 | 48 | 33 | 31 | 65 | 31 |
| | Evaluation | C | C | C | C | C | C |
| Water resistance | Image suvival rate (%) | 87 | 59 | 50 | 59 | 78 | 57 |
| | Evaluation | B | C | C | C | C | C |
| Ethanol resistance | Image suvival rate (%) | 43 | 63 | 26 | 54 | 64 | 27 |
| | Evaluation | C | C | C | C | C | C |
| Temperature and humidity resistance | Image suvival rate (%) | 85 | 97 | 100 | 36 | 100 | 8 |
| | Evaluation | B | A | A | C | A | C |
| Wet abrasion resistance | Evaluation | I | I | I | I | II | II |
| Heat resistance (110° C.) | Background density | 0.24 | 1.16 | 1.66 | 0.17 | 0.14 | 0.11 |
| | Evaluation | I | II | II | I | I | I |
| Heat resistance (90° C.) | Background density | 0.15 | 0.40 | 0.30 | 0.14 | 0.10 | 0.11 |
| | Evaluation | I | II | II | I | I | I |

For example, embodiments of the present disclosure are as follows.

<1> A thermosensitive recording medium including:

a support; and a thermosensitive recording layer disposed on or above the support, wherein the thermosensitive recording layer include a compound represented by General Formula (1) and a styrene-acryl resin,

[Chem.15]

General Formula (1)

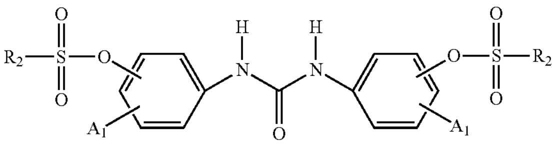

where, in General Formula (1), $R_2$ is a C1-12 straight-chain, branched-chain, or alicyclic alkyl group, C7-12 aralkyl group that is substituted with a C1-12 alkyl group, a C1-12 alkoxy group, a C6-12 aryl group or a halogen atom, or a C6-12 aryl group that is unsubstituted or substituted with a C1-12 alkyl group, a C1-12 alkoxy group, a C6-12 aryl group, or a halogen atom, where two or more $R_2$ may be identical to or different from each other; and $A_1$ is a hydrogen atom or a C1-4 alkyl group, where two or more $A_1$, may be identical to or different from each other.

<2> The thermosensitive recording medium according to <1>, wherein the compound represented by General Formula (1) is a compound represented by General Formula (2),

[Chem.16]

General Formula (2)

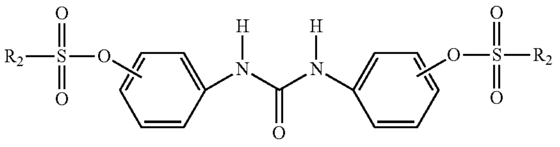

where, in General Formula (2), $R_2$ is a C1-12 straight-chain, branched-chain, or alicyclic alkyl group, a C7-12 aralkyl group that is unsubstituted or substituted with a C1-12 alkyl group, a C1-12 alkoxy group, a C6-12 aryl group, or a halogen atom, or a C6-12 aryl group that is unsubstituted or substituted with a C1-12 alkyl group, a C1-12 alkoxy group, a C6-12 aryl group, or a halogen atom, where two or more $R_2$ may be identical to or different from each other.

<3> The thermosensitive recording medium according to <2>, wherein the compound represented by General Formula (2) is a compound represented by General Formula (3), where, in General Formula (1), $R_2$ is a C1-12 straight-chain, branched-chain, or alicyclic alkyl group, C7-12 aralkyl group that is substituted with a C1-12 alkyl group, a C1-12 alkoxy group, a C6-12 aryl group or a halogen atom, or a C6-12 aryl group that is unsubstituted or substituted with a C1-12 alkyl group, a C1-12 alkoxy group, a C6-12 aryl group, or a halogen atom, where two or more $R_2$ may be identical to or different from each other; and $A_1$ is a hydrogen atom or a C1-4 alkyl group, where two or more $A_1$, may be identical to or different from each other.

[Chem.17]

General Formula (3)

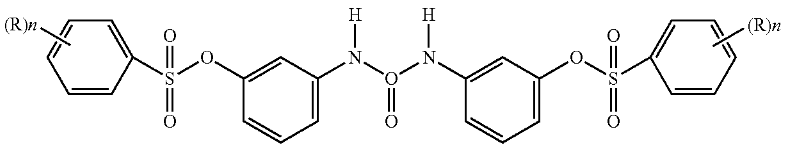

where, in General Formula (3), R is an alkyl group; and n is an integer of from 0 through 3.

<4> The thermosensitive recording medium according to any one of <1> to <3>, wherein the thermosensitive recording layer further includes a photothermal conversion material.

<5> The thermosensitive recording medium according to any one of <1> to <4>, wherein the support is a plastic film.

<6> The thermosensitive recording medium according to any one of <1> to <5>, wherein the support is a transparent film.

<7> The thermosensitive recording medium according to any one of <1> to <6>, further including a protective layer disposed on or above the thermosensitive recording layer.

<8> The thermosensitive recording medium according to any one of <1> to <6>, further including a printed layer disposed between the support and the thermosensitive recording layer, or on an opposite surface of the support to the surface of the support on which the thermosensitive recording layer is disposed, or on or above the support and the thermosensitive recording layer.

<9> A thermosensitive recording layer forming liquid including:

a compound represented by General Formula (1);

a styrene-acryl resin, and a solvent,

[Chem.18]

General Formula (1)

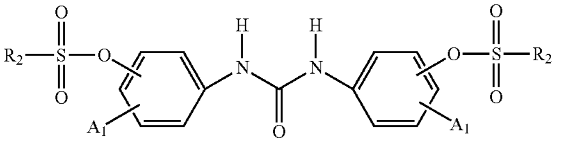

<10> The thermosensitive recording layer forming liquid according to <9>, wherein the compound represented by General Formula (1) is a compound represented by General Formula (2),

[Chem.19]

General Formula (2)

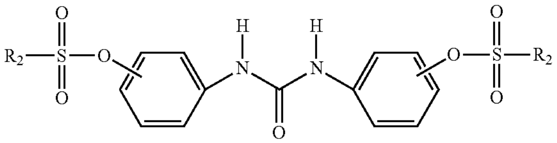

where, in General Formula (2), $R_2$ is a C1-12 straight-chain, branched-chain, or alicyclic alkyl group, a C7-12 aralkyl group that is unsubstituted or substituted with a C1-12 alkyl group, a C1-12 alkoxy group, a C6-12 aryl group, or a halogen atom, or a C6-12 aryl group that is unsubstituted or substituted with a C1-12 alkyl group, a C1-12 alkoxy group, a C6-12 aryl group, or a halogen atom, where two or more $R_2$ may be identical to or different from each other.

<11> The thermosensitive recording layer forming liquid according to <10>, wherein the compound represented by General Formula (2) is a compound represented by General Formula (3),

[Chem.20]

General Formula (3)

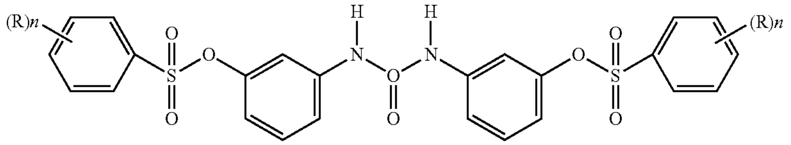

where, in General Formula (3), R is an alkyl group; and n is an integer of from 0 through 3.

<12> A method for producing a thermosensitive recording medium, the method including:

applying the thermosensitive recording layer forming liquid according to any one of <9> to <11> onto a support to form a thermosensitive recording layer.

<13> An image recording method including irradiating the thermosensitive recording medium according to any one of <1> to <8> with laser light to record an image.

<14> An image recording method including heating the thermosensitive recording medium according to any one of <1> to <8> with a thermal head to record an image.

The thermosensitive recording medium according to any one of <1> to <8>, the thermosensitive recording layer forming liquid according to any one of <9> to <11>, the method for producing a thermosensitive recording medium according to <12>, and the image recording method according to <13> to <14> can solve the above-described various problems existing in the art, and can achieve the object of the present disclosure.

REFERENCE SIGNS LIST

1: support
2: thermosensitive recording layer
3: protective layer
4: printed layer

The invention claimed is:

1. A thermosensitive recording medium, comprising:

a support; and a thermosensitive recording layer disposed on or above the support, wherein the thermosensitive recording layer includes a compound represented by General Formula (2) a styrene-acryl resin, and a leuco dye, General Formula (2)

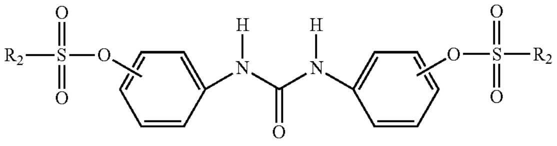

where, in General Formula (2), $R_2$ is a C6-12 aryl group that is unsubstituted or substituted with a C1-12 alkyl group, a C1-12 alkoxy group, or a C6-12 aryl group, where the $R_2$'s may be identical to or different from each other.

2. The thermosensitive recording medium according to claim 1, wherein the compound represented by General Formula (2) is a compound represented by General Formula (3), General Formula (3)

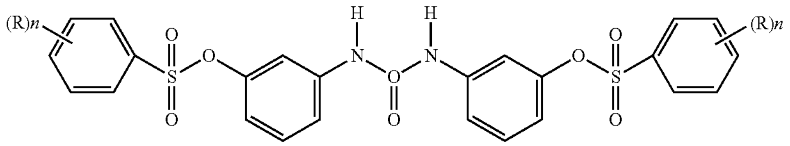

where, in General Formula (3), R is an alkyl group; and n is an integer of from 0 through 3.

3. The thermosensitive recording medium according to claim 1, wherein the thermosensitive recording layer further includes a photothermal conversion material.

4. The thermosensitive recording medium according to claim 1, wherein the support is a plastic film.

5. The thermosensitive recording medium according to claim 1, wherein the support is a transparent film.

6. The thermosensitive recording medium according to claim 1, further comprising:

a printed layer disposed between the support and the thermosensitive recording layer, or on an opposite surface of the support to a surface of the support on which the thermosensitive recording layer is disposed, or on or above the support and the thermosensitive recording layer.

7. The thermosensitive recording medium according to claim 1, wherein an amount of the styrene-acryl resin is 1.0% by mass or greater but 50% by mass or less, relative to a total amount of the thermosensitive recording layer.

8. The thermosensitive recording medium according to claim 1, wherein a deposition amount of a thermosensitive recording layer forming liquid for forming the thermosensitive recording layer is 1 $g/m^2$ or greater but 20 $g/m^2$ or less.

9. The thermosensitive recording medium according to claim 1, wherein an image survival rate of the thermosensitive recording layer calculated by results of an image density of the thermosensitive recording layer before and after immersing in water at 23° C., for 96 hours, is 80% or greater.

10. The thermosensitive recording medium according to claim 1, wherein an image survival rate of the thermosensitive recording layer calculated by results of an image density of the thermosensitive recording layer before and after immersing in an 80% by mass ethanol aqueous solution for 30 seconds, is 80% or greater.

11. The thermosensitive recording medium according to claim 1, wherein the compound of General Formula (2) is:

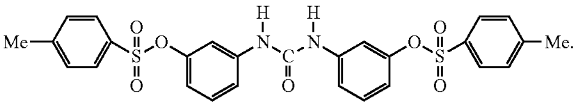

12. The thermosensitive recording medium according to claim 1, wherein an amount of the styrene-acryl resin is 10.0% by mass or greater but 50.0% by mass or less, relative to a total amount of the thermosensitive recording layer.

13. The thermosensitive recording medium according to claim 1, wherein an amount of the styrene-acryl resin is 20.0% by mass or greater but 40.0% by mass or less, relative to a total amount of the thermosensitive recording layer.

14. The thermosensitive recording medium according to claim 1, wherein the compound of General Formula (2) is selected from one of the following compounds:

[Chem. 10]

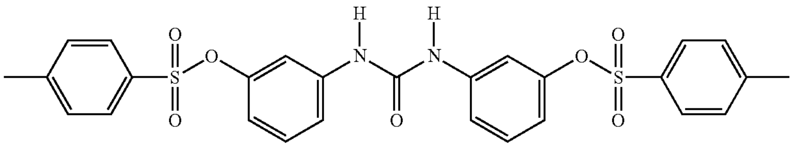,

[Chem. 11]

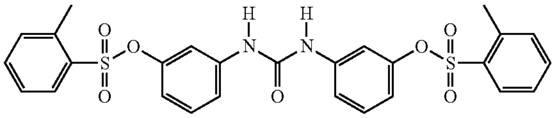,

[Chem. 12]

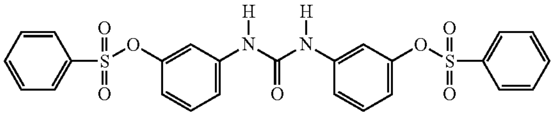,

[Chem. 13]

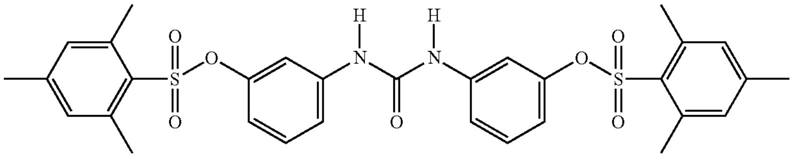, and

[Chem. 14]

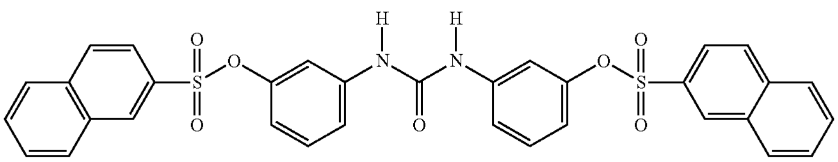.

15. A thermosensitive recording layer forming liquid, comprising:

a compound represented by General Formula (2)

a styrene-acryl resin, a leuco dye, and a solvent,

General Formula (2)

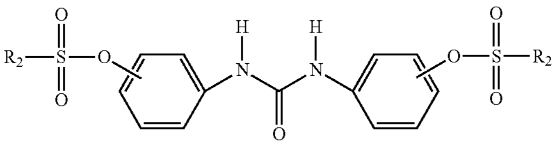

where, in General Formula (2), $R_2$ is a C6-12 aryl group that is unsubstituted or substituted with a C1-12 alkyl group, a C1-12 alkoxy group, or a C6-12 aryl group, where the $R_2$'s may be identical to or different from each other.

16. The thermosensitive recording layer forming liquid according to claim 15, wherein the compound represented by General Formula (2) is a compound represented by General Formula (3), General Formula (3)

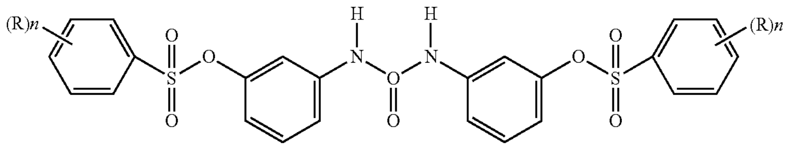

where, in General Formula (3), R is an alkyl group; and n is an integer of from 0 through 3.

17. A method for producing a thermosensitive recording medium, the method comprising:

applying the thermosensitive recording layer forming liquid according to claim 9 onto a support to form a thermosensitive recording layer.

18. An image recording method, comprising:

irradiating the thermosensitive recording medium according to claim 1 with laser light to record an image.

19. An image recording method, comprising:

heating the thermosensitive recording medium according to claim 1 with a thermal head to record an image.

* * * * *